(12) United States Patent  
Nakano

(10) Patent No.: US 11,054,702 B2  
(45) Date of Patent: Jul. 6, 2021

(54) OPTICAL COMPENSATION DEVICE, LIQUID CRYSTAL DISPLAY UNIT, AND PROJECTION DISPLAY APPARATUS

(71) Applicant: SONY CORPORATION, Tokyo (JP)

(72) Inventor: Shintaro Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/969,525

(22) PCT Filed: Feb. 1, 2019

(86) PCT No.: PCT/JP2019/003669  
§ 371 (c)(1),  
(2) Date: Aug. 12, 2020

(87) PCT Pub. No.: WO2019/163486  
PCT Pub. Date: Aug. 29, 2019

(65) Prior Publication Data  
US 2020/0409198 A1 Dec. 31, 2020

(30) Foreign Application Priority Data  
Feb. 20, 2018 (JP) .............................. JP2018-027924

(51) Int. Cl.  
*G02F 1/13363* (2006.01)  
*G02F 1/1335* (2006.01)  
(Continued)

(52) U.S. Cl.  
CPC .... *G02F 1/13363* (2013.01); *G02F 1/133528* (2013.01); *G03B 21/006* (2013.01); *G03B 33/12* (2013.01)

(58) Field of Classification Search  
None  
See application file for complete search history.

(56) References Cited

U.S. PATENT DOCUMENTS

| 6,396,630 B1 | 5/2002 | Stiens et al. |
| 2018/0231826 A1* | 8/2018 | Oh .................... G02F 1/133502 |

(Continued)

FOREIGN PATENT DOCUMENTS

| JP | 2006-011298 A | 1/2006 |
| JP | 2007-011206 A | 1/2007 |

(Continued)

OTHER PUBLICATIONS

International Search Report and Written Opinion of PCT Application No. PCT/JP2019/003669, dated May 7, 2019, 09 pages of ISRWO.

*Primary Examiner* — Phu Vu  
(74) *Attorney, Agent, or Firm* — Chip Law Group

(57) ABSTRACT

An optical compensation device used in a liquid crystal display unit of the present invention includes: a first underlayer (332A) including a plurality of structures (332A1) that each includes at least two surfaces having inclination angles different from each other; a first multilayered film (332B) provided on the first underlayer (332A), and including at least two refractive index films (332b1 and, 332b2) that are alternately stacked and have refractive indices different from each other: a second underlayer (332C) including a plurality of structures (332C1) that each includes at least two surfaces having inclination angles different from each other, and being opposed to the first underlayer (332A) with the first multilayered film (332B) interposed therebetween; and a second multilayered film (332D) provided on the second underlayer (332C), and including at least two refractive index films (332d1 and 332d2) that are alternately stacked and have refractive indices different from each other, and an array pitch of the plurality of the structures (332A1 or 332C1) in each of the first underlayer (332A) and the second (Continued)

underlayer (332C) is smaller than a wavelength of visible light.

20 Claims, 22 Drawing Sheets

(51) Int. Cl.
  *G03B 21/00*  (2006.01)
  *G03B 33/12*  (2006.01)

(56) References Cited

U.S. PATENT DOCUMENTS

2019/0315013 A1\* 10/2019 Sugihara .................. B27F 7/36
2019/0317352 A1\* 10/2019 Saitoh ................. G02F 1/13362

FOREIGN PATENT DOCUMENTS

| | | |
|---|---|---|
| JP | 2007-052218 A | 3/2007 |
| JP | 2008-145816 A | 6/2008 |
| JP | 2010-156896 A | 7/2010 |
| JP | 2013-174649 A | 9/2013 |
| WO | 2008/081919 A1 | 7/2008 |
| WO | 2018/042912 A1 | 3/2018 |

\* cited by examiner

[ FIG. 1 ]
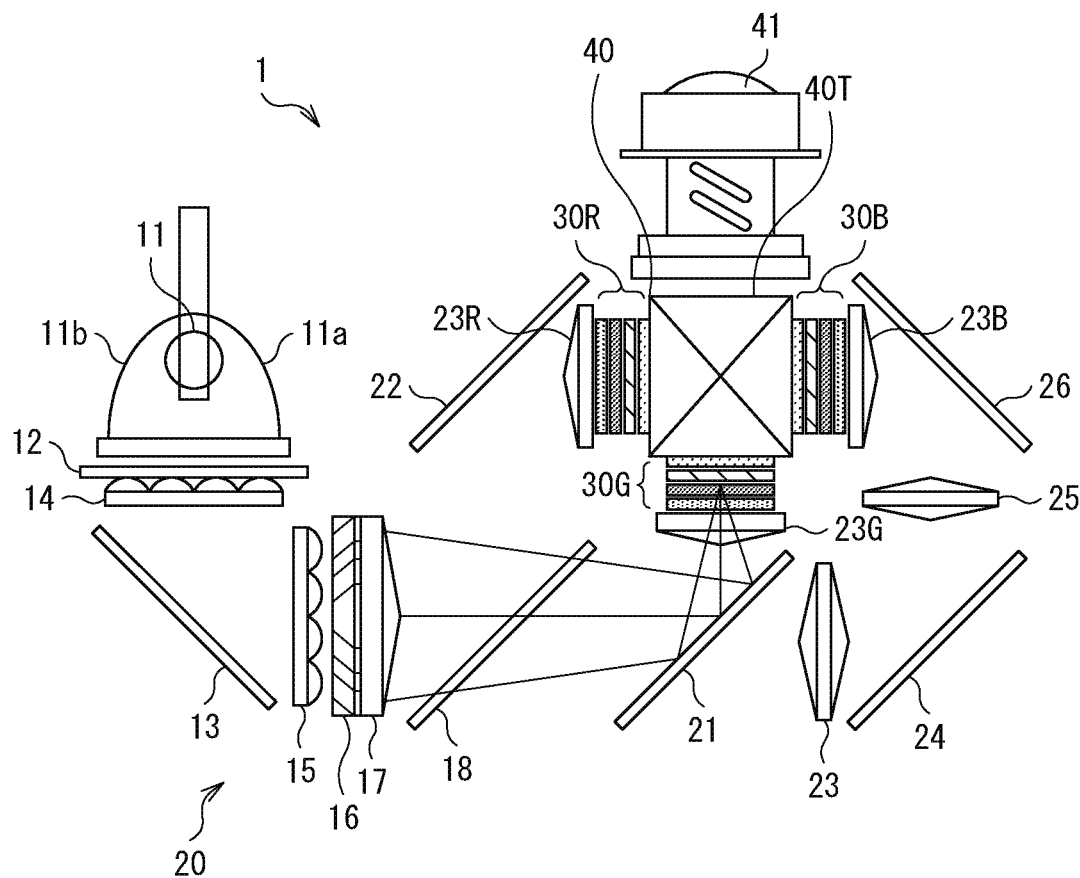
[ FIG. 2 ]
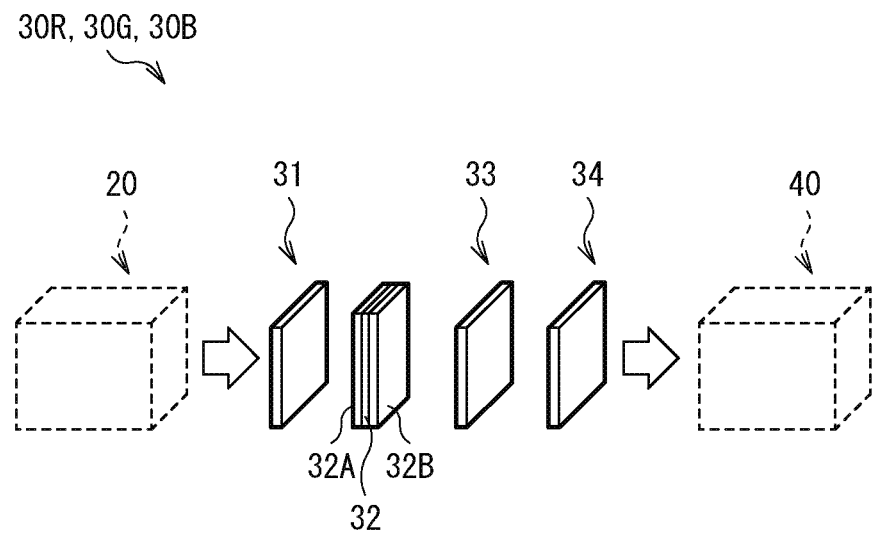

[ FIG. 3 ]
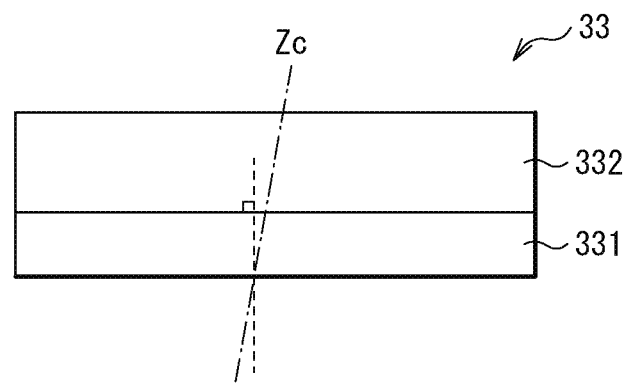
[ FIG. 4A ]
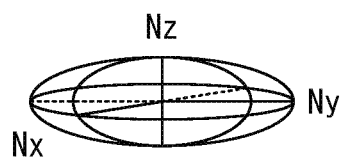
[ FIG. 4B ]
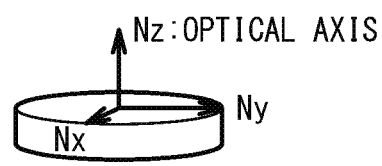

[FIG. 5]
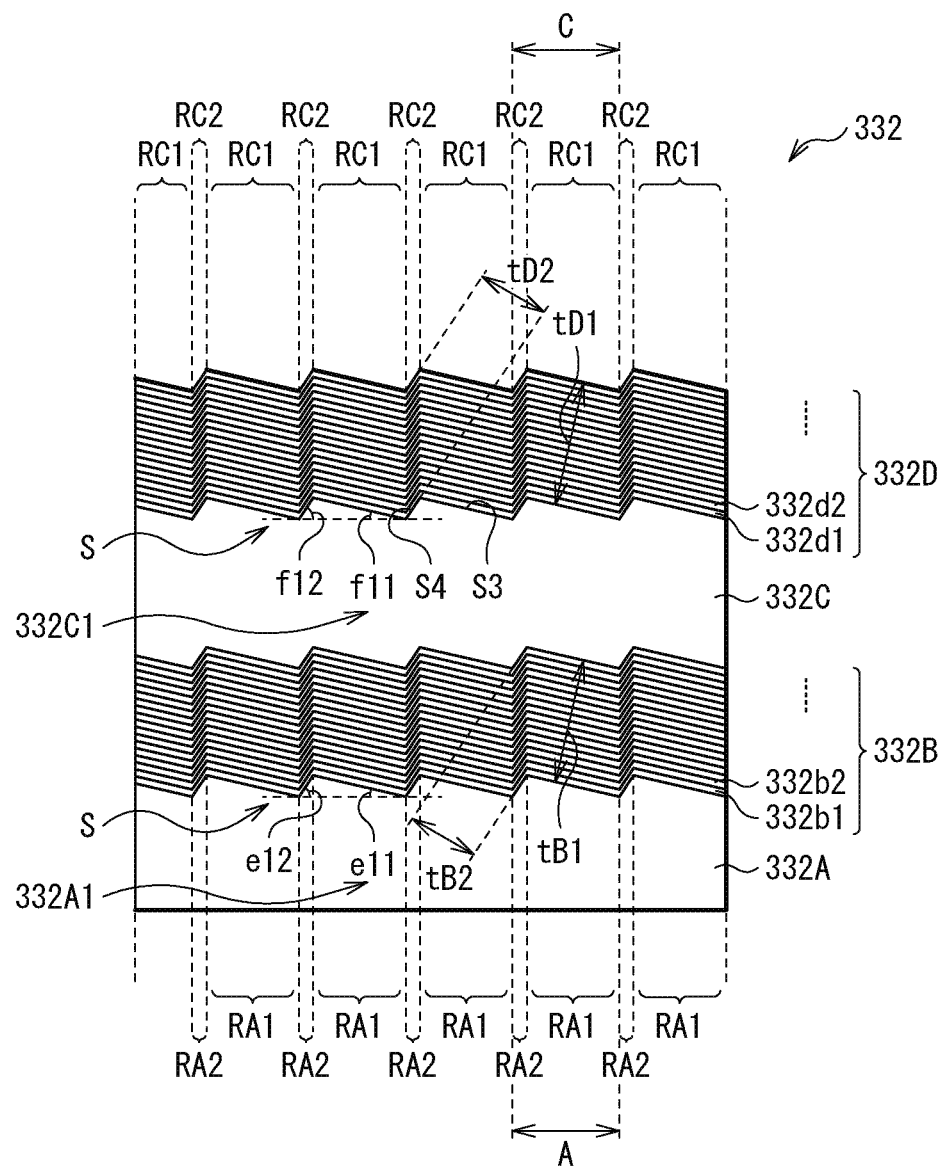

[ FIG. 6A ]
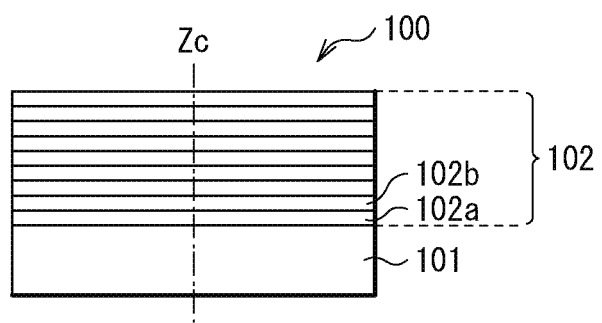
[ FIG. 6B ]
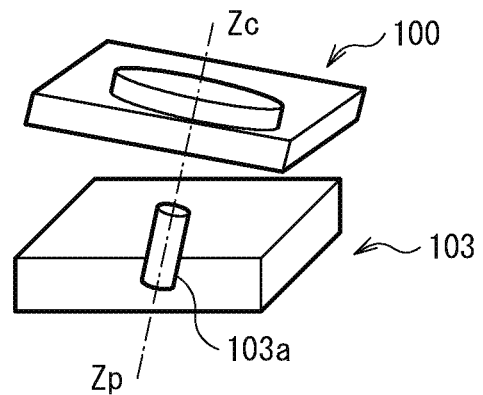

[ FIG. 7A ]
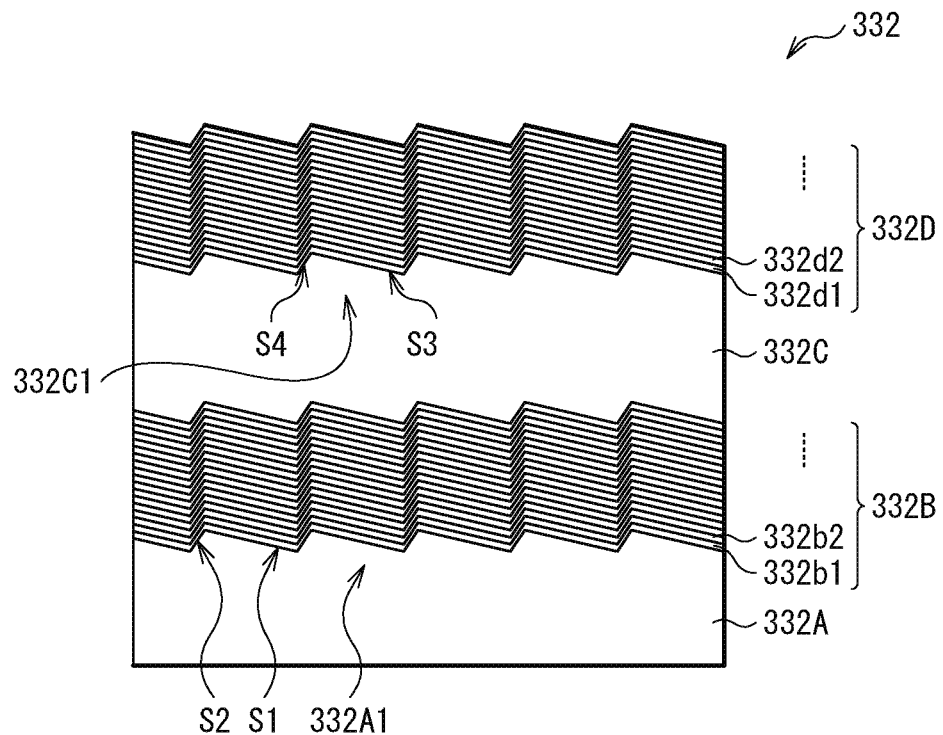
[ FIG. 7B ]
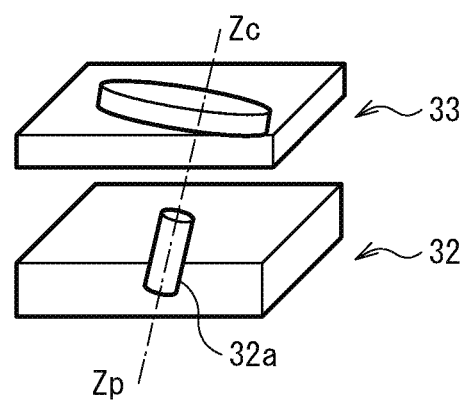

[ FIG. 8 ]
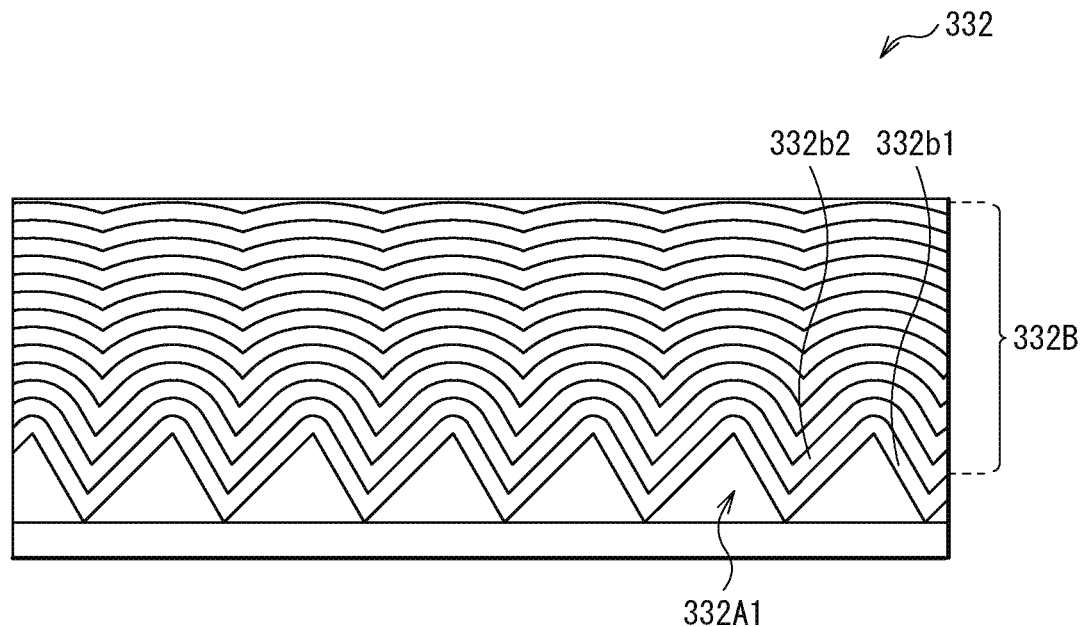
[ FIG. 9 ]
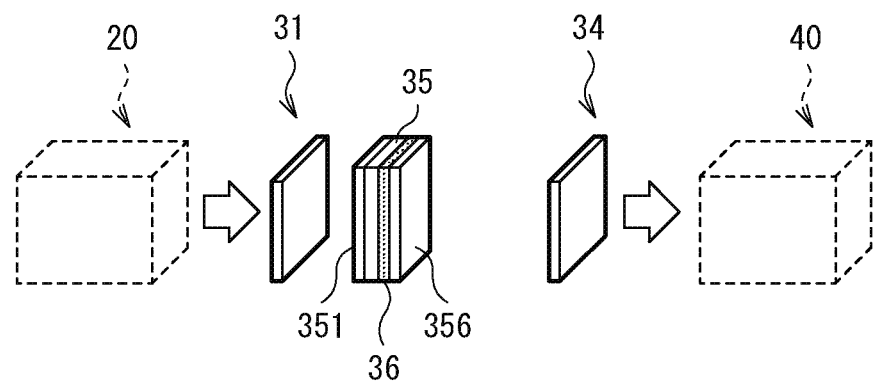

[FIG. 10]
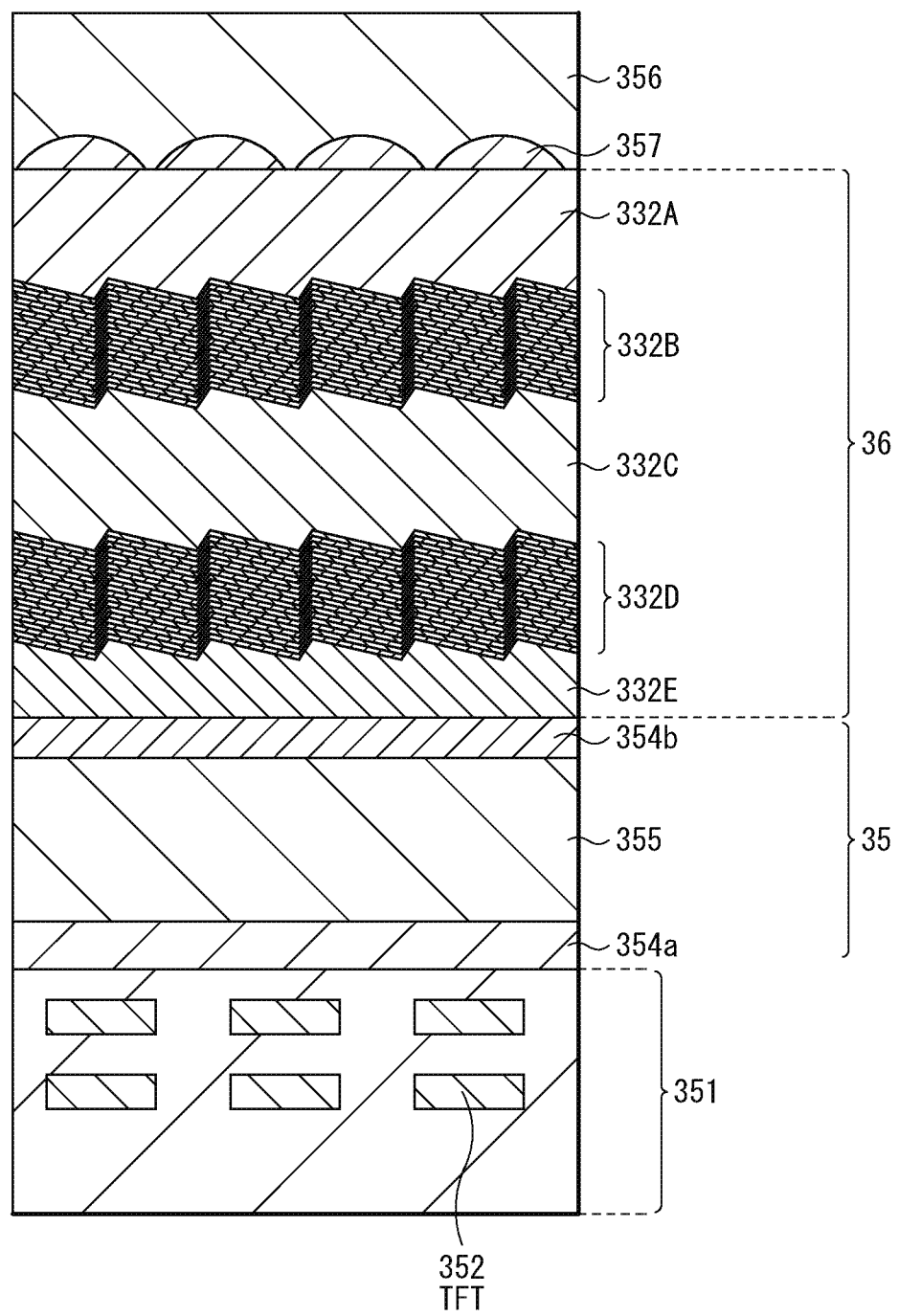

[FIG. 11]
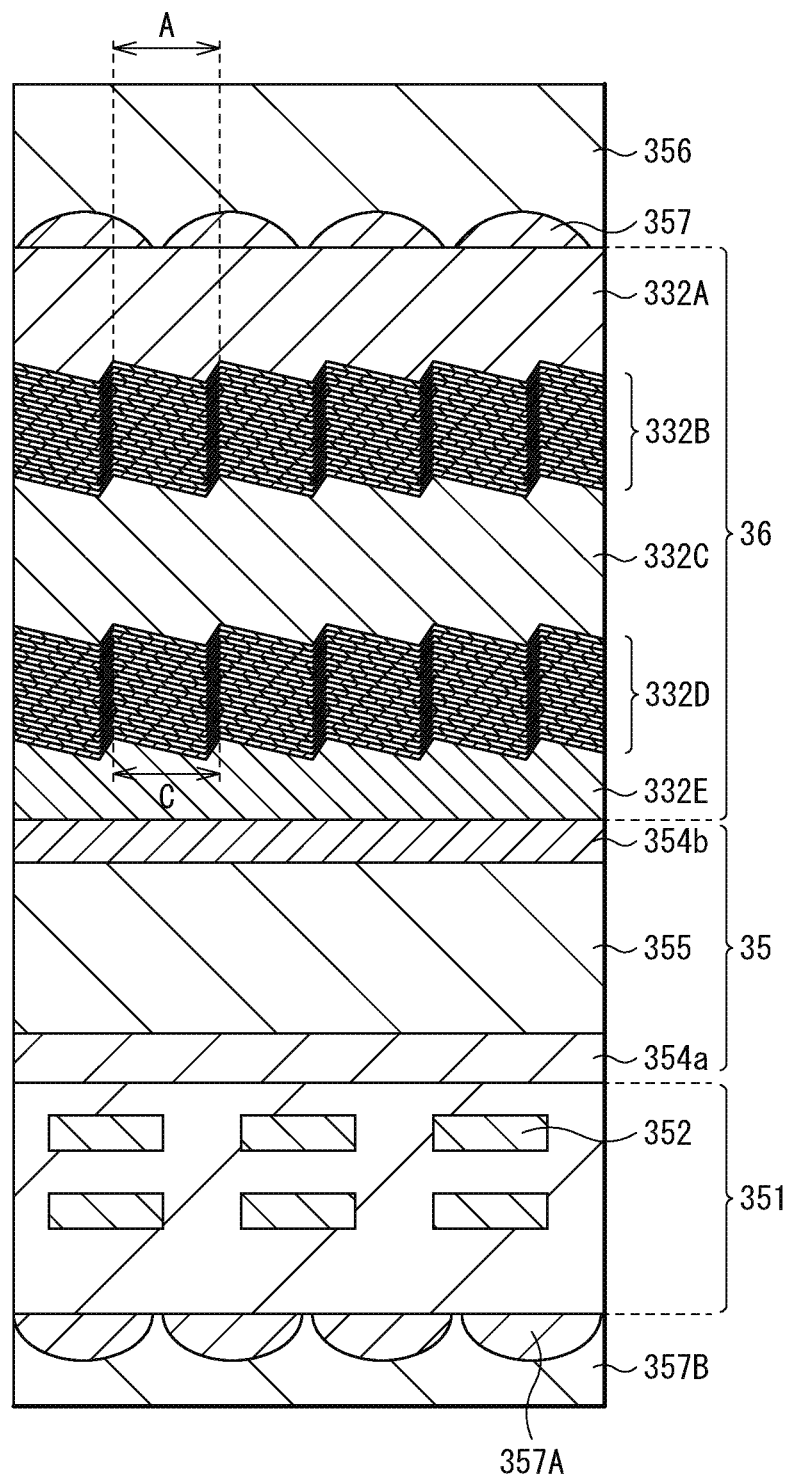

[ FIG. 12A ]
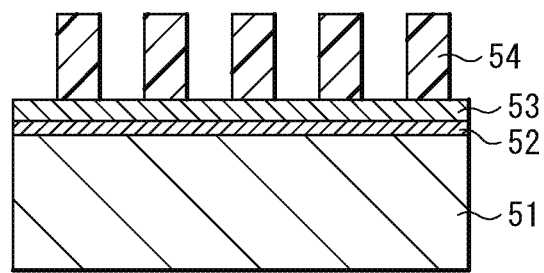
[ FIG. 12B ]
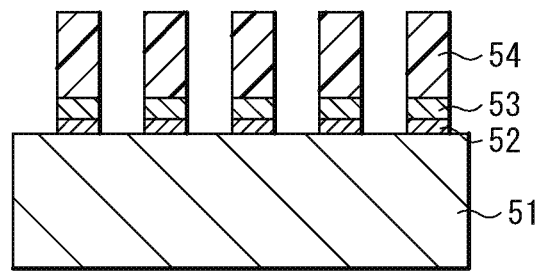
[ FIG. 12C ]
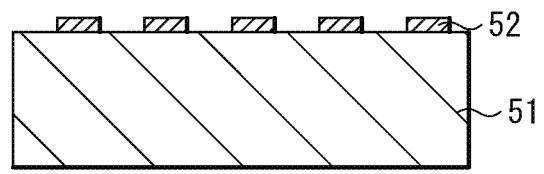

[ FIG. 12D ]
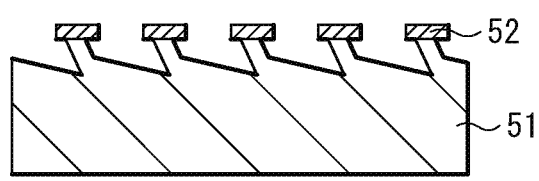
[ FIG. 12E ]
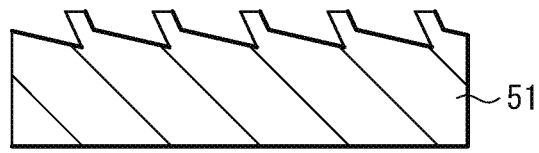
[ FIG. 12F ]
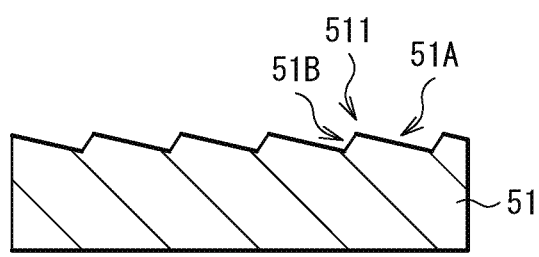

[ FIG. 12G ]
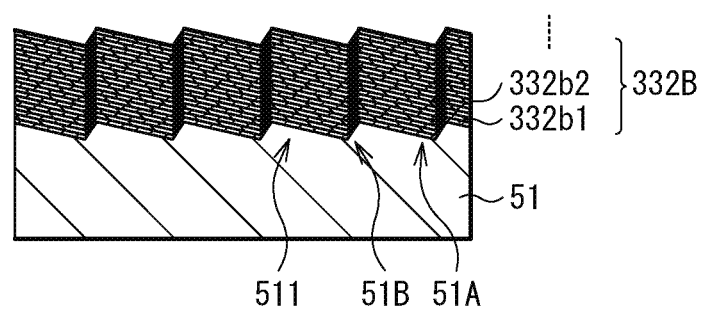
[ FIG. 12H ]
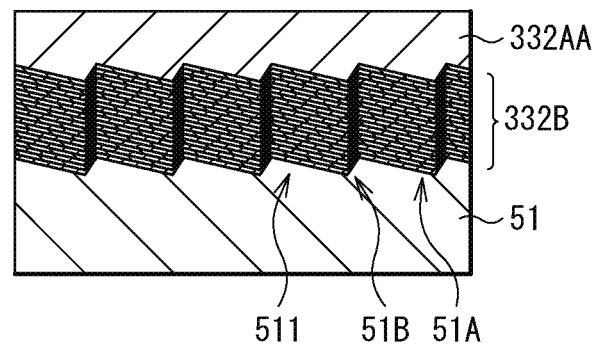

[ FIG. 13A ]
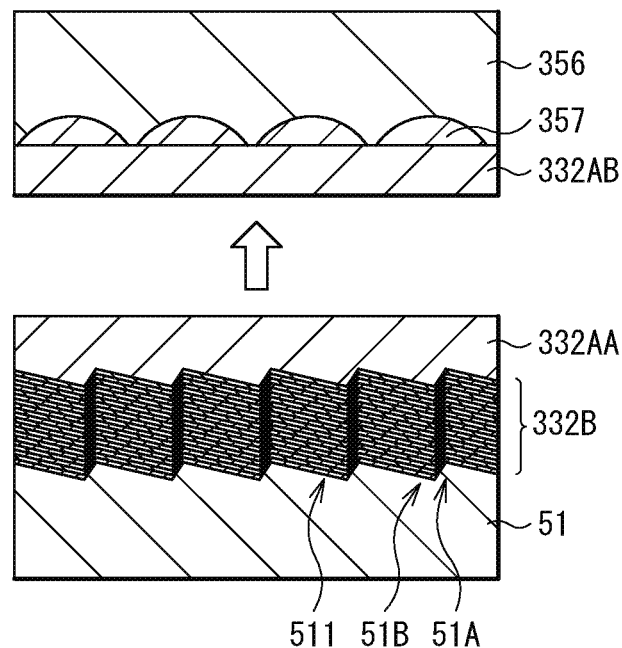
[ FIG. 13B ]
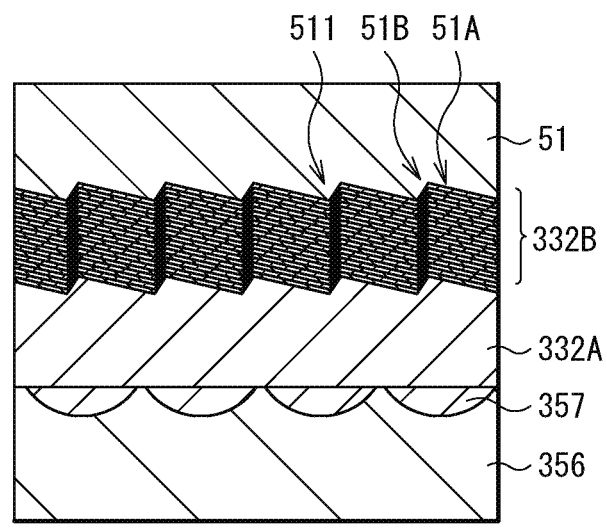

[ FIG. 13C ]
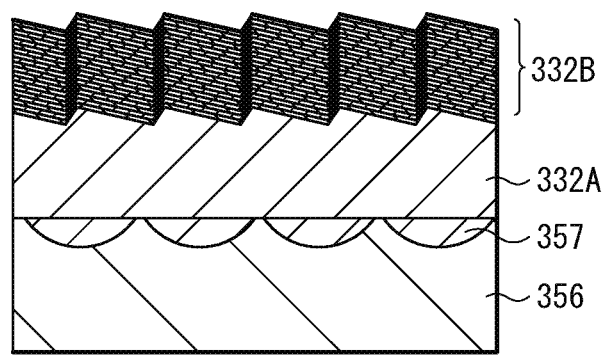
[ FIG. 13D ]
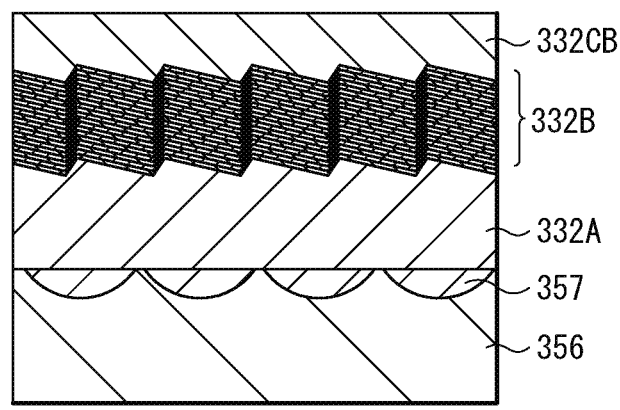

[ FIG. 14A ]
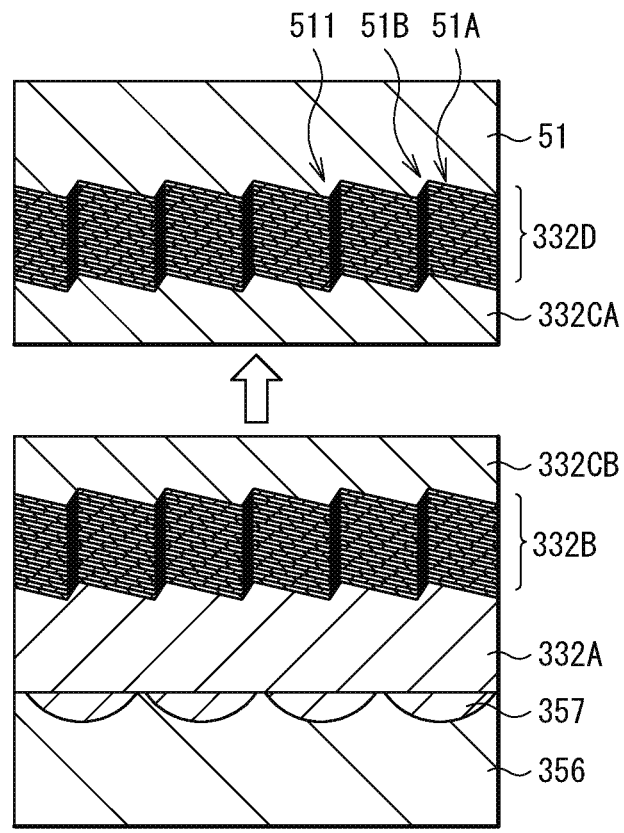
[ FIG. 14B ]
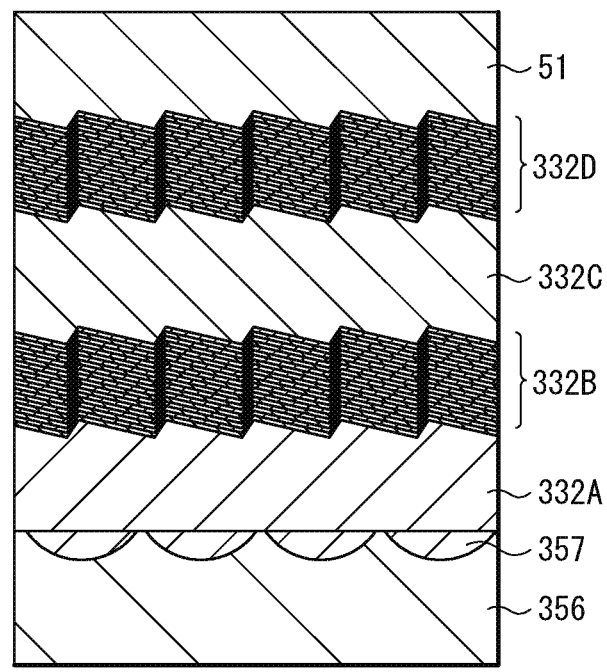

[ FIG. 14C ]
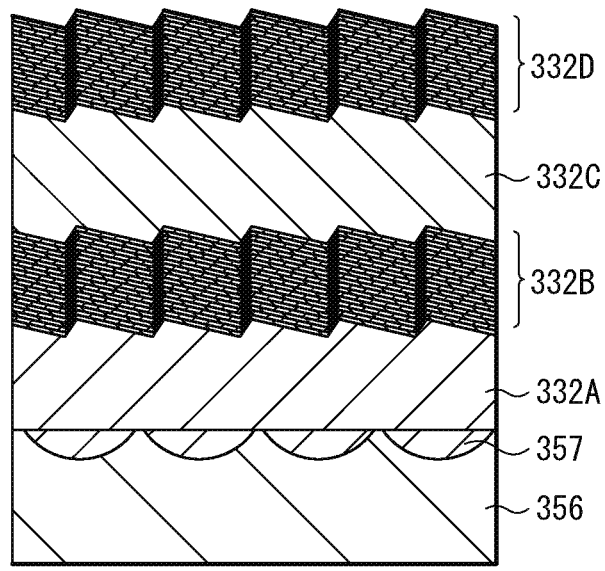
[ FIG. 14D ]
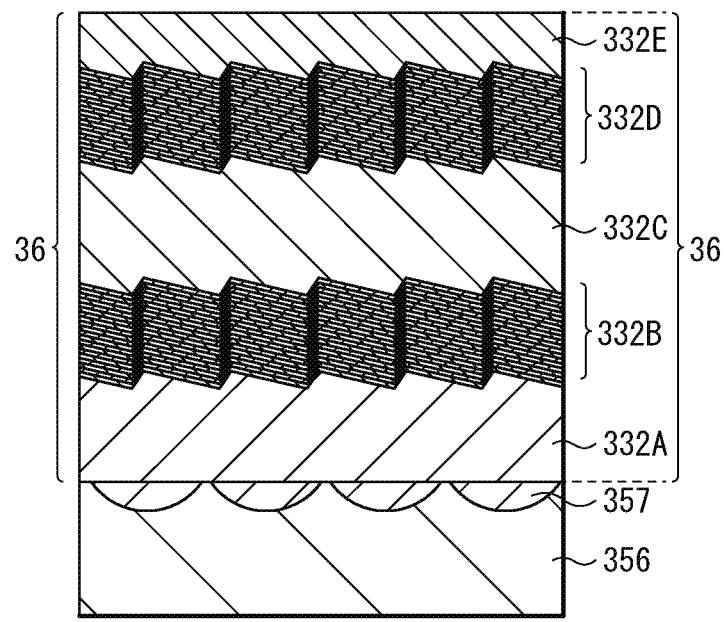

[ FIG. 15 ]
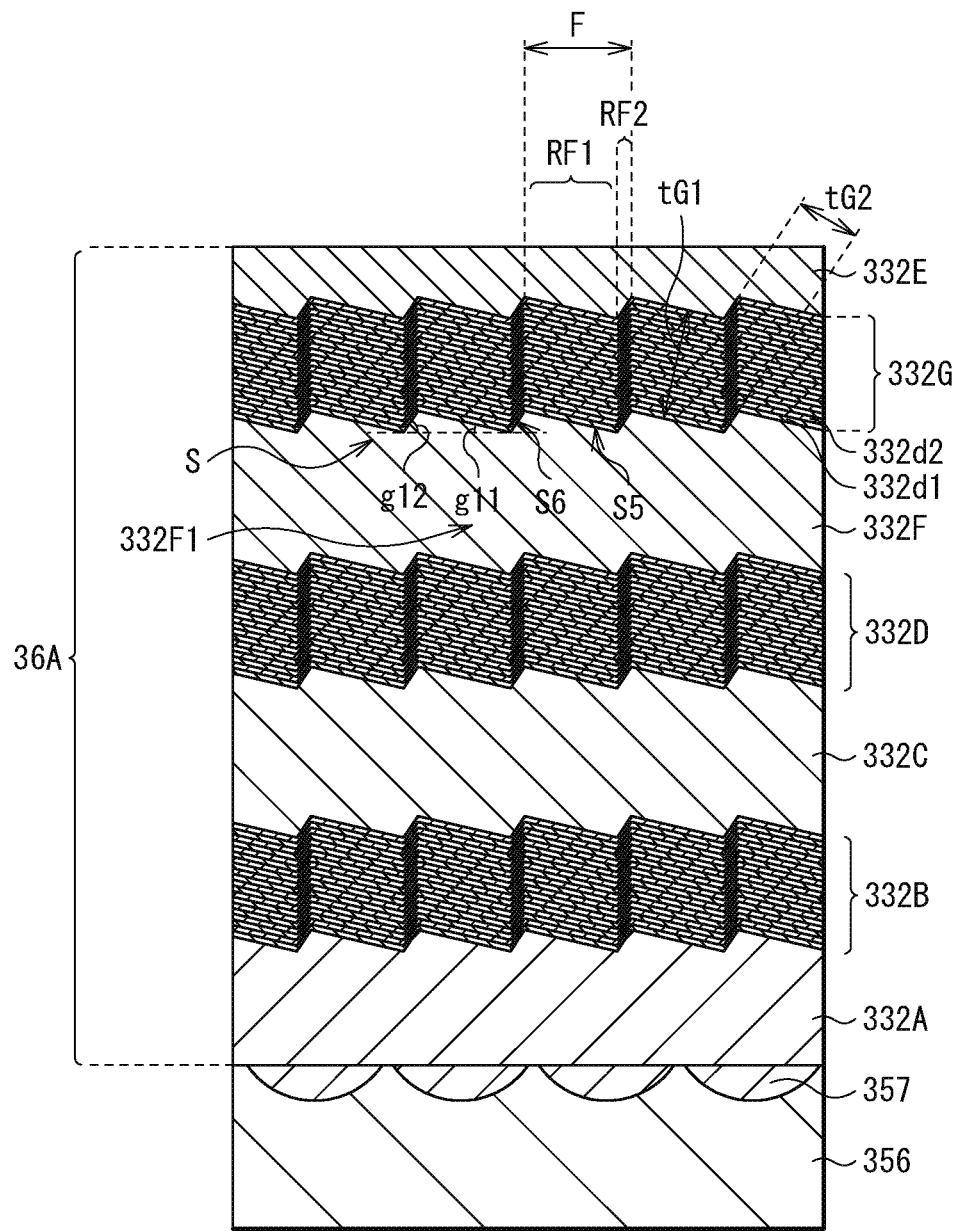

[ FIG. 16 ]
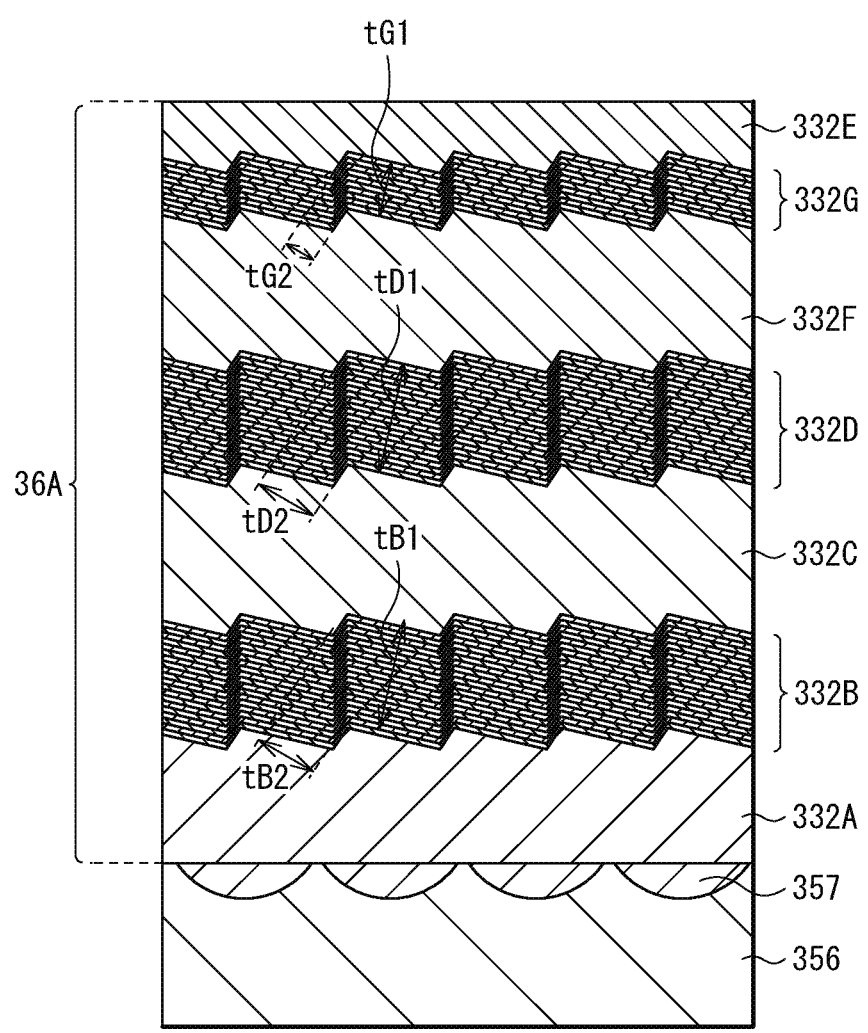

[ FIG. 17 ]
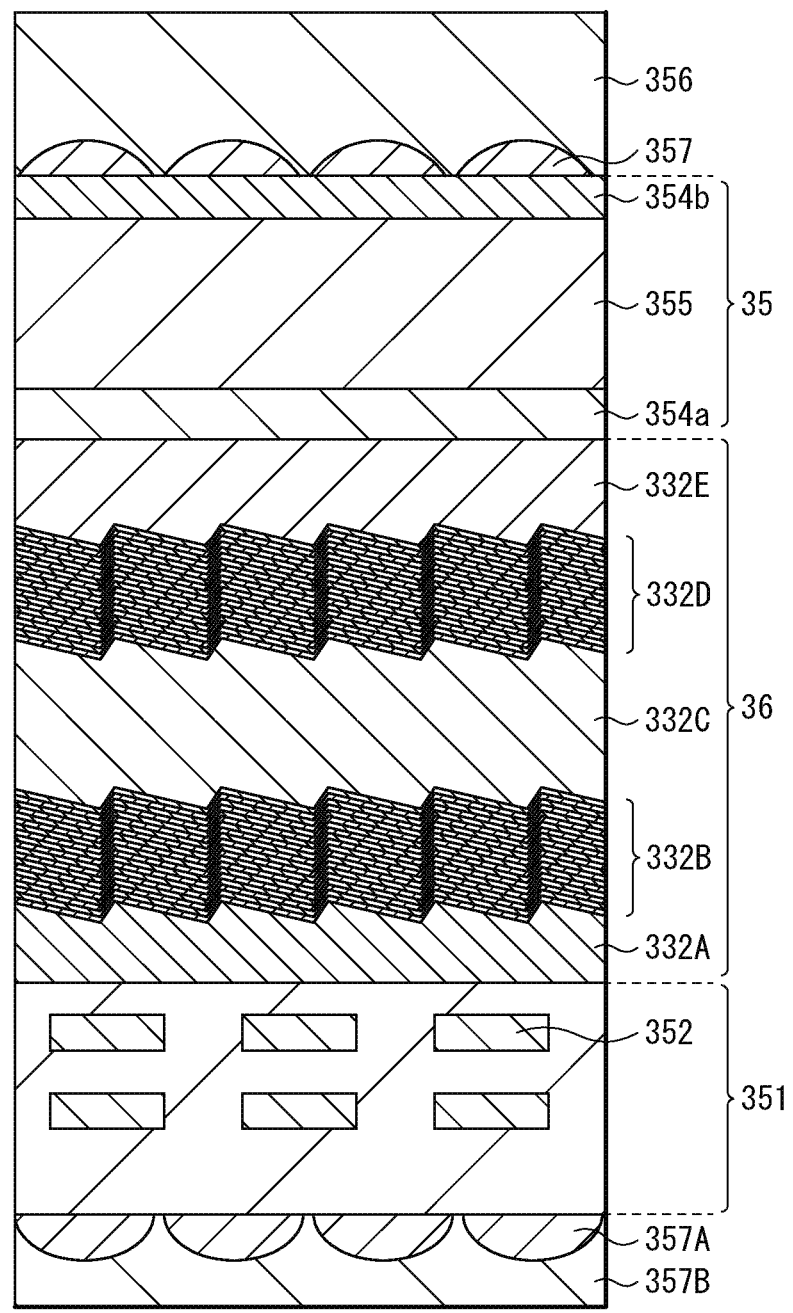

[ FIG. 18 ]
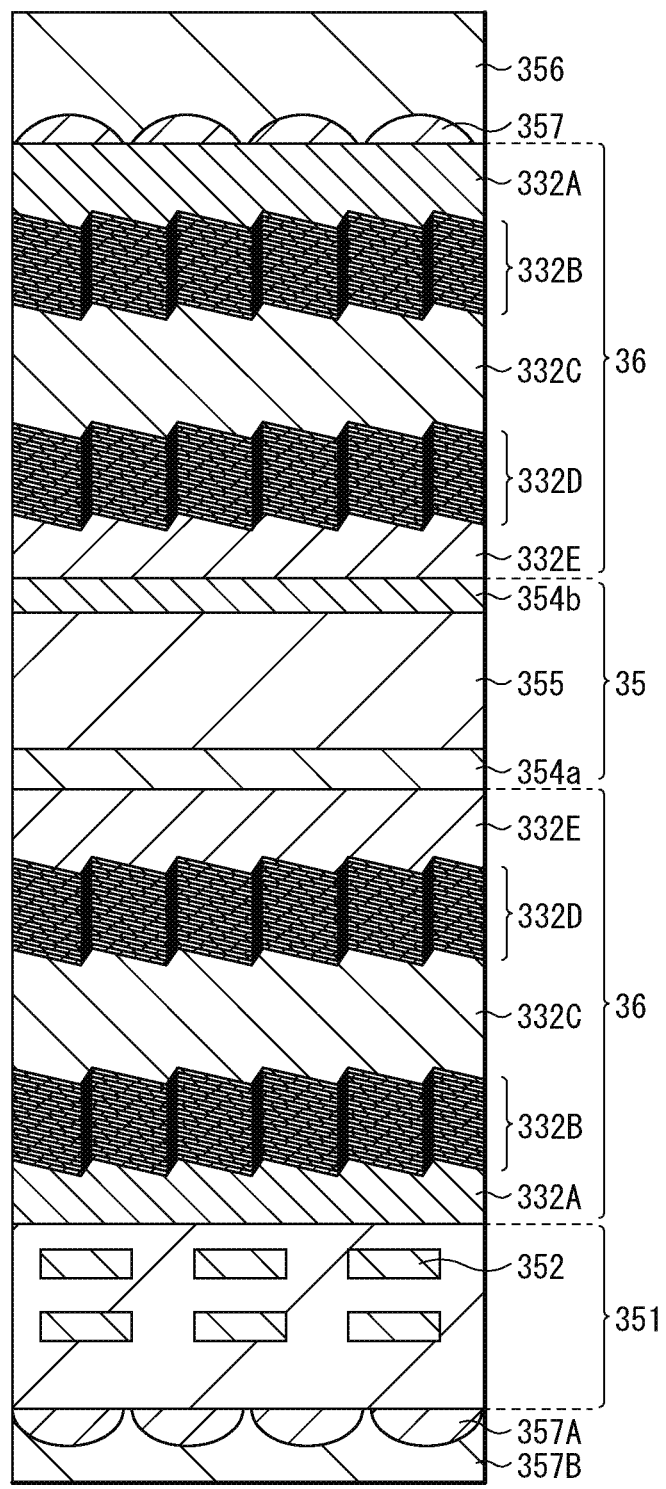

[ FIG. 19 ]
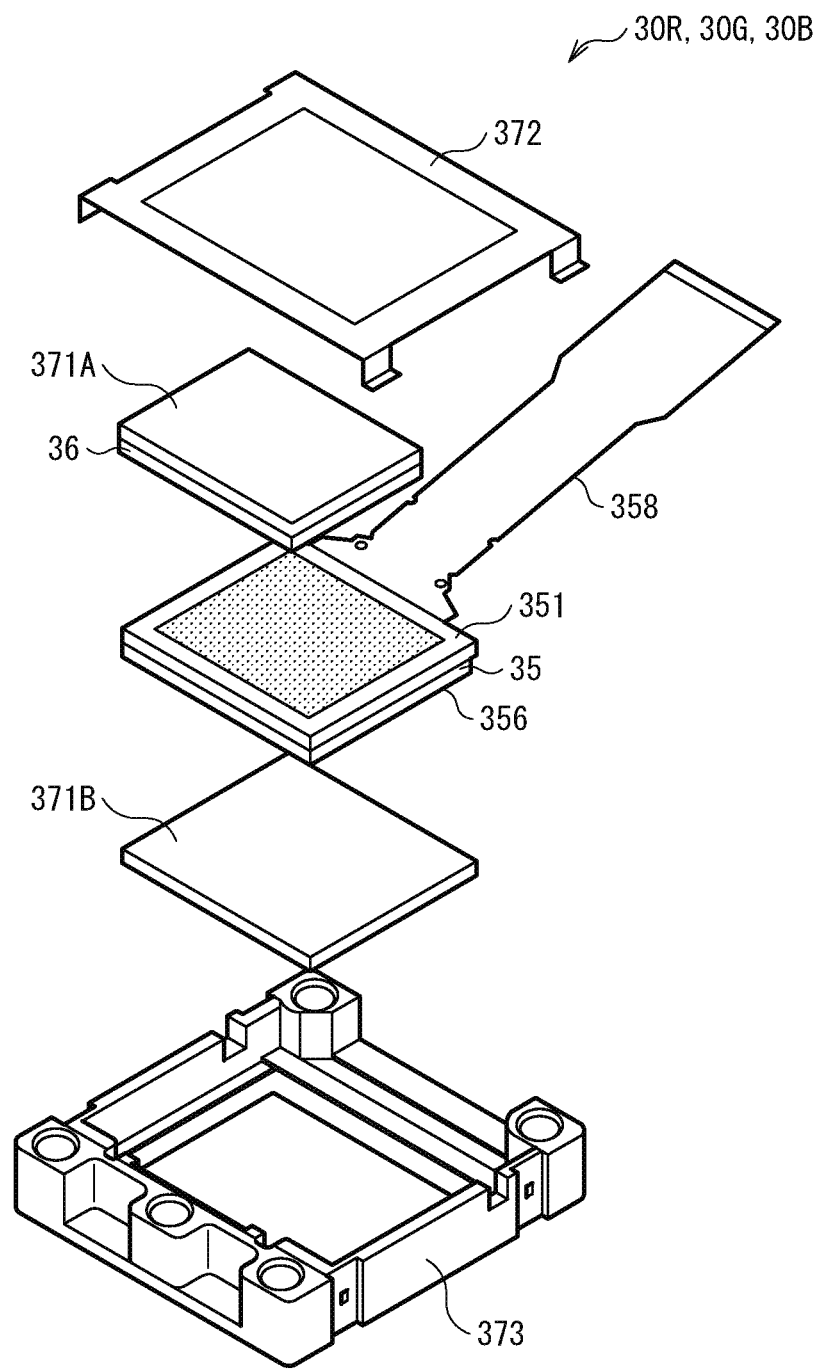

[ FIG. 20 ]
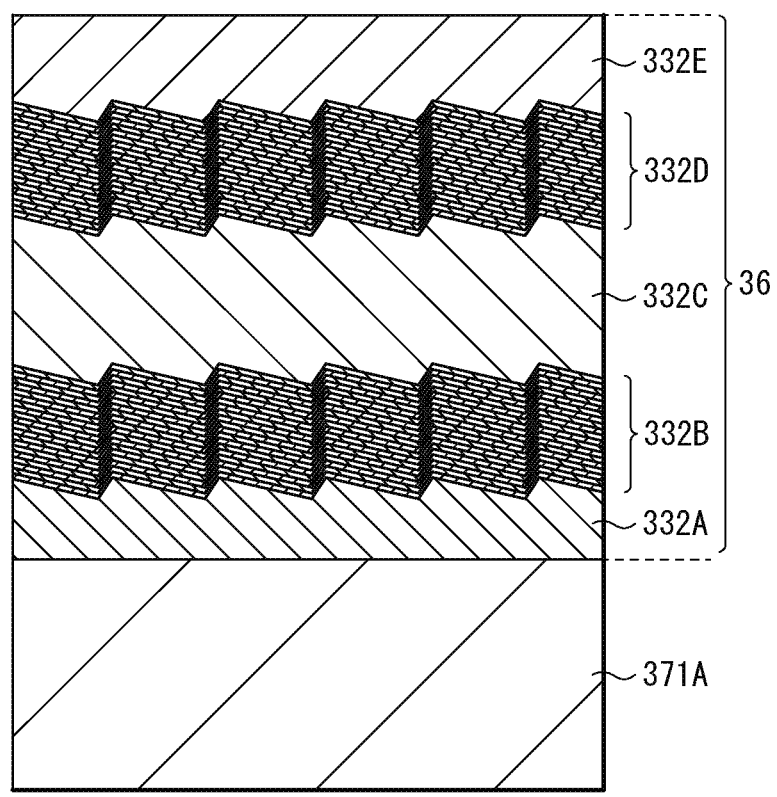

[ FIG. 21 ]
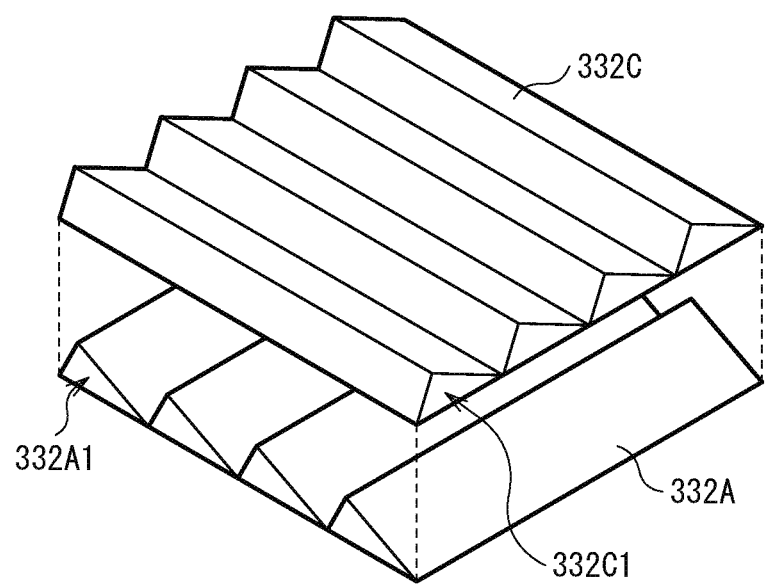

OPTICAL COMPENSATION DEVICE, LIQUID CRYSTAL DISPLAY UNIT, AND PROJECTION DISPLAY APPARATUS

CROSS REFERENCE TO RELATED APPLICATIONS

This application is a U.S. National Phase of International Patent Application No. PCT/JP2019/003669 filed on Feb. 1, 2019, which claims priority benefit of Japanese Patent Application No. JP 2018-027924 filed in the Japan Patent Office on Feb. 20, 2018. Each of the above-referenced applications is hereby incorporated herein by reference in its entirety.

TECHNICAL FIELD

The present disclosure relates to an optical compensation device and a liquid crystal display unit including the optical compensation device, and a projection display apparatus using such a liquid crystal display unit.

BACKGROUND ART

In recent years, vertical alignment (VA mode) liquid crystal has become the mainstream of liquid crystal used in a liquid crystal panel of a projection display apparatus such as a liquid crystal projector. This liquid crystal display unit uses, for example, an optical compensator that compensates residual retardation when a black screen is displayed.

Examples of such an optical compensator include an O-plate including a liquid crystal polymer (PTL 1) or a negative C-plate (PTLs 2 to 4).

CITATION LIST

Patent Literature

PTL 1: International Publication WO 2008/081919
PTL 2: Japanese Unexamined Patent Application Publication No. 2006-11298
PTL 3: Japanese Unexamined Patent Application Publication No. 2008-145816
PTL 4: Japanese Unexamined Patent Application Publication No. 2007-52218

SUMMARY OF THE INVENTION

A liquid crystal display unit using an optical compensator (an optical compensation device) as described above is expected to achieve high luminance and a high contrast ratio.

A liquid crystal display unit according to an embodiment of the present disclosure includes a pair of polarizers; a liquid crystal display device provided between the pair of polarizers; and an optical compensation device provided in a light path of light passing through the liquid crystal display device, and the optical compensation device includes a first underlayer including a plurality of structures that each includes at least two surfaces having inclination angles different from each other, a first multilayered film provided on the first underlayer, and including at least two refractive index films that are alternately stacked and have refractive indices different from each other, a second underlayer including a plurality of the structures, and being opposed to the first underlayer with the first multilayered film interposed therebetween, and a second multilayered film provided on the second underlayer, and including at least two refractive index films that are alternately stacked and have refractive indices different from each other. An array pitch of the plurality of the structures in each of the first underlayer and the second underlayer is smaller than a wavelength of visible light.

A projection display apparatus according to an embodiment of the present disclosure includes the liquid crystal display unit according to the embodiment of the present disclosure described above.

In the liquid crystal display unit and the projection display apparatus according to the embodiments of the present disclosure, the optical compensation device includes the first underlayer and the second underlayer. The first underlayer and the second underlayer each include a plurality of the structures that each includes at least two surfaces having inclination angles different from each other. Respectively forming the first multilayered film and the second multilayered film on the first underlayer and the second underlayer causes the optical compensation device to serve as a negative C-plate with an optical axis tilted. Accordingly, residual retardation of the liquid crystal display device is compensated. Here, the array pitch of the plurality of the structures in each of the first underlayer and the second underlayer is smaller than the wavelength of visible light, which suppresses an influence of diffraction on the optical compensation device and reduces light loss.

An optical compensation device according to an embodiment of the present disclosure includes: a first underlayer including a plurality of structures that each includes at least two surfaces having inclination angles different from each other; a first multilayered film provided on the first underlayer, and including at least two refractive index films that are alternately stacked and have refractive indices different from each other; a second underlayer including a plurality of the structures, and being opposed to the first underlayer with the first multilayered film interposed therebetween; and a second multilayered film provided on the second underlayer, and including at least two refractive index films that are alternately stacked and have refractive indices different from each other, and an array pitch of the plurality of the structures in each of the first underlayer and the second underlayer is smaller than a wavelength of visible light.

The optical compensation device according to the embodiment of the present disclosure includes the first underlayer and the second underlayer. The first underlayer and the second underlayer each include the plurality of the structures that each includes at least two surfaces having inclination angles different from each other. The first multilayered film and the second multilayered film are respectively formed on the first underlayer and the second underlayer. Accordingly, the optical compensation device serves as a negative C-plate with an optical axis tilted, and residual retardation of the liquid crystal display device is compensated. Here, the array pitch of the plurality of the structures in each of the first underlayer and the second underlayer is smaller than the wavelength of visible light, which suppresses an influence of diffraction on the optical compensation device and reduces light loss.

According to the liquid crystal display unit and the projection display apparatus in the embodiments of the present disclosure, the array pitch of the plurality of the structures in each of the first underlayer and the second underlayer is smaller than the wavelength of visible light, which makes it possible to reduce light loss and increase luminance. This makes it possible to achieve high luminance and a high contrast ratio.

According to the optical compensation device in the embodiment of the present disclosure, the array pitch of the plurality of the structures in each of the first underlayer and the second underlayer is smaller than the wavelength of visible light, which makes it possible to reduce light loss. In a liquid crystal display unit including the optical compensation device, it is possible to achieve high luminance and a high contrast ratio.

It is to be noted that the effects described here are not necessarily limited, but any of effects described in the present disclosure may be included.

BRIEF DESCRIPTION OF DRAWING

FIG. 1 is a diagram illustrating an overall configuration example of a projection display apparatus using a liquid crystal display unit according to a first embodiment of the present disclosure.

FIG. 2 is a schematic diagram illustrating a configuration example of the liquid crystal display unit illustrated in FIG. 1.

FIG. 3 is a schematic diagram illustrating a configuration example of an optical compensator illustrated in FIG. 2.

FIG. 4A is a schematic diagram illustrating an index ellipsoid.

FIG. 4B is a schematic diagram for describing an optical axis of a negative C-plate.

FIG. 5 is a schematic cross-sectional view of an example of a layered structure illustrated in FIG. 3.

FIG. 6A is a schematic cross-sectional view of a configuration of an optical compensator according to a comparative example.

FIG. 6B is a schematic diagram for describing workings of the optical compensator illustrated in FIG. 6A.

FIG. 7A is a schematic cross-sectional view of a configuration of the layered structure illustrated in FIG. 5.

FIG. 7B is a schematic diagram for describing workings of an optical compensator including the layered structure illustrated in FIG. 7A.

FIG. 8 is a schematic cross-sectional view of a configuration of the layered structure illustrated in FIG. 5 from which a second underlayer is removed.

FIG. 9 is a schematic diagram illustrating a configuration example of a liquid crystal display unit according to a second embodiment of the present disclosure.

FIG. 10 is a schematic cross-sectional view of a main section for describing an optical compensation layer illustrated in FIG. 9.

FIG. 11 is a schematic cross-sectional view of another example of a configuration of the main section of the liquid crystal display unit illustrated in FIG. 10.

FIG. 12A is a schematic cross-sectional view of a process for forming the optical compensation layer illustrated in FIG. 10.

FIG. 12B is a schematic cross-sectional view of a process following FIG. 12A.

FIG. 12C is a schematic cross-sectional view of a process following FIG. 12B.

FIG. 12D is a schematic cross-sectional view of a process following FIG. 12C.

FIG. 12E is a schematic cross-sectional view of a process following FIG. 12D.

FIG. 12F is a schematic cross-sectional view of a process following FIG. 12E.

FIG. 12G is a schematic cross-sectional view of a process following FIG. 12F.

FIG. 12H is a schematic cross-sectional view of a process following FIG. 12G.

FIG. 13A is a schematic cross-sectional view of a process following FIG. 12G.

FIG. 13B is a schematic cross-sectional view of a process following FIG. 13A.

FIG. 13C is a schematic cross-sectional view of a process following FIG. 13B.

FIG. 13D is a schematic cross-sectional view of a process following FIG. 13C.

FIG. 14A is a schematic cross-sectional view of a process following FIG. 13D.

FIG. 14B is a schematic cross-sectional view of a process following FIG. 14A.

FIG. 14C is a schematic cross-sectional view of a process following FIG. 14B.

FIG. 14D is a schematic cross-sectional view of a process following FIG. 14C.

FIG. 15 is a schematic cross-sectional view of a main section for describing a configuration of an optical compensation layer according to a modification example 1.

FIG. 16 is a schematic cross-sectional view of a main section for describing another example of the configuration of the optical compensation layer illustrated in FIG. 15.

FIG. 17 is a schematic cross-sectional view of a main section for describing a configuration of an optical compensation layer according to a modification example 2.

FIG. 18 is a schematic cross-sectional view of a main section for describing another example of the configuration of the optical compensation layer illustrated in FIG. 17.

FIG. 19 is an exploded perspective view of a main section illustrating a configuration example of a liquid crystal display unit according to a third embodiment of the present disclosure.

FIG. 20 is a schematic cross-sectional view of a main section for describing an optical compensation layer illustrated in FIG. 19.

FIG. 21 is a perspective view of another example of configurations of a first underlayer and a second underlayer illustrated in FIG. 5.

MODES FOR CARRYING OUT THE INVENTION

The following describes embodiments of the present disclosure in detail with reference to the drawings. It is to be noted that description is given in the following order.
1. First Embodiment (An example of a liquid crystal display unit in which an optical compensator is provided between a liquid crystal display device and a polarizer, and a projection display apparatus)
2. Second Embodiment (An example of a liquid crystal display unit in which an optical compensation layer is provided on a pair of substrates opposed to each other with a liquid crystal display device interposed therebetween)
3. Modification Example 1 (An example in which an optical compensation layer includes a third underlayer and a third multilayered film)
4. Modification Example 2 (An example in which an optical compensation layer is bonded to a drive substrate)
5. Third Embodiment (An example of a liquid crystal display unit in which an optical compensation layer is provided on a protective substrate)

First Embodiment

Configuration

FIG. 1 illustrates an overall configuration example of a projection display apparatus (a projection display apparatus 1) according to a first embodiment of the present disclosure. Examples of this projection display apparatus 1 include a transmissive 3-chip liquid crystal projector apparatus. The projection display apparatus 1 includes a light source 11, an illumination optical system 20, liquid crystal display units 30R, 30G, and 30B, a color synthesizing prism 40, and a projection lens unit 41.

The light source 11 is configured to emit white light including light of red, green, and blue that are three primary colors of light necessary to project a full-color image. The light source 11 includes, for example, a light emitter 11a that emits white light and a reflector 11b that reflects light emitted from the light emitter 11a. As the light emitter 11a of the light source 11, a discharge lamp filled with a gas containing a mercury component, for example, an extra-high pressure mercury lamp or the like is used. The reflector 11b of the light source 11 includes a concave mirror, of which a mirror surface has a shape having high circumferential efficiency. In addition, the reflector 11b has, for example, a shape of a rotationally symmetric surface such as a paraboloid of revolution or an ellipsoid of revolution. The light source 11 may include a laser light source, a laser light source, a phosphor light source, or an LED (Light Emitting Diode) light source. Alternatively, the light source 11 may include a combination of these light sources.

The illumination optical system 20 includes, for example, a cut filter 12 that cuts off light outside a visible region, a first multi-lens array 14 and a second multi-lens array 15, a PS synthetic resin 16 for polarizing light from the second multi-lens array 15 in a predetermined polarization direction, a condenser lens 17 that concentrates light having passed through the PS synthetic resin 16, and a first dichroic mirror 18 that separates light in accordance with wavelength bands in order along a light path of light emitted from the light source 11.

The cut filter 12 includes a plane mirror that reflects light in an ultraviolet region included in white light emitted from the light source 11 to remove the light in the ultraviolet region. The cut filter 12 includes, for example, a glass substrate coated with a coating that reflects light in the ultraviolet region, and allows light in a region other than the ultraviolet region to pass therethrough.

The first multi-lens array 14 and the second multi-lens array 15 each include, for example, a plurality of lens cells arranged in an array. The plurality of lens cells each has a similar external shape with an aspect ratio nearly equal to an aspect ratio of an effective pixel region of a liquid crystal display device 32. A first turning mirror 13 that reflects light is disposed between the first multi-lens array 14 and the second multi-lens array 15. To uniformly illuminate the effective pixel region of the liquid crystal display device 32 to be described later, the first multi-lens array 14 and the second multi-lens array 15 make light into a light flux having a shape of an effective area of the liquid crystal display device 32 and homogenize an illuminance distribution. The first multi-lens array 14 concentrates the light reflected by the first turning mirror 13 with use of respective lens cells thereof to generate small point light sources, and the second multi-lens array 15 synthesizes illumination light from the respective point light sources.

The condenser lens 17 includes a convex lens, and adjusts a spot diameter to efficiently irradiate the effective pixel region of the liquid crystal display device 32 with light controlled to be polarized in a predetermined polarization direction by the PS synthetic resin 16.

The first dichroic mirror 18 includes a wavelength-selective mirror that includes a glass substrate or the like having a main surface coated with a so-called dichroic coating in which multiple dielectric films are formed. The first dichroic mirror 18 separates light into red light that is to be reflected and other color light, i.e., green light and blue light that are to pass therethrough. Specifically, the first dichroic mirror 18 is disposed at a 45° tilt in a direction perpendicular to a light path of light incident from the condenser lens 17 to allow blue light and green light of the light incident from the condenser lens 17 to pass therethrough, and to reflect red light to change a direction of the red light by 90°.

The illumination optical system 20 further includes, for example, a second turning mirror 22 that totally reflects light, a first field lens 23R, and the liquid crystal display unit 30R in order along a light path of red light separated by the first dichroic mirror 18.

The second turning mirror 22 includes a total reflection mirror that reflects light reflected by the first dichroic mirror 18 to change a direction of the light by 90°, and is disposed at a 45° tilt in a direction perpendicular to a light path of the reflected red light. Accordingly, the second turning mirror 22 reflects this red light toward the first field lens 23R. The first field lens 23R includes a converging lens, and outputs the red light reflected by the second turning mirror 22 toward the liquid crystal display unit 30R and also concentrates the red light on the liquid crystal display device 32 in the liquid crystal display unit 30R. A configuration of the liquid crystal display unit 30R is described later.

The illumination optical system 20 further includes, for example, a second dichroic mirror 21 that separates incident light in accordance with wavelength bands, along a light path of blue light and green light separated by the first dichroic mirror 18.

The second dichroic mirror 21 separates incident light into blue light and other color light, i.e., green light. The second dichroic mirror 21 is disposed at a 45° tilt in a direction perpendicular to a light path of light incident from the first dichroic mirror 18 to allow blue light of the light incident from the first dichroic mirror 18 to pass therethrough, and to reflect green light to change a direction of the green light by 90°.

The illumination optical system 20 further includes, for example, a second field lens 23G and the liquid crystal display unit 30G in order along a light path of green light separated by the second dichroic mirror 21.

The second field lens 23G includes a converging lens, and outputs green light reflected by the second dichroic mirror 21 toward the liquid crystal display unit 30G and also concentrates the green light on the liquid crystal display device 32 in the liquid crystal display unit 30G. A configuration of the liquid crystal display unit 30G is described later.

The illumination optical system 20 further includes, for example, a first relay lens 23, a third turning mirror 24 that totally reflects incident light, a second relay lens 25, a fourth turning mirror 26 that totally reflects incident light, a third field lens 23B, and the liquid crystal display unit 30B in order along a light path of blue light separated by the second dichroic mirror 21.

The first relay lens 23 includes a lens for adjusting a light path length together with the second relay lens 25, and guides blue light separated by the second dichroic mirror 21 to the third turning mirror 24. The third turning mirror 24 includes a total reflection mirror that reflects light from the first relay lens 23 to change a direction of the light by 90°, and is disposed at a 45° tilt in a direction perpendicular to a light path of blue light from the first relay lens 23. Accordingly, the third turning mirror 24 reflects the blue light from the first relay lens 23 toward the second relay lens 25. The second relay lens 25 includes a lens for adjusting the light path length together with the first relay lens 23, and guides the blue light reflected by the third turning mirror 24 to the fourth turning mirror 26.

It is to be noted that the light path of blue light to the liquid crystal display unit 30B is longer than the light path of red light to the liquid crystal display unit 30R and the light path of green light to the liquid crystal display unit 30G; therefore, the first relay lens 23 and the second relay lens 25 perform correction to cause the blue light to be focused on the liquid crystal display device 32 in the liquid crystal display unit 30B.

The fourth turning mirror 26 includes a total reflection mirror that reflects light from the second relay lens 25 to change a direction of the light by 90°, and is disposed at a 45° tilt in a direction perpendicular to a light path of blue light from the second relay lens 25. Accordingly, the fourth turning mirror 26 reflects the blue light from the second relay lens 25 toward the third field lens 23B. The third field lens 23B includes a converging lens, and outputs the blue light reflected by the fourth turning mirror 26 toward the liquid crystal display unit 30B and also concentrates the blue light on the liquid crystal display device 32 in the liquid crystal display unit 30B. A configuration of the liquid crystal display unit 30B is described later.

The color synthesizing prism 40 is disposed at a position where the light paths of red light, green light, and blue light respectively outputted from the liquid crystal display units 30R, 30G, and 30B intersect with each other. The color synthesizing prism 40 synthesizes incident red light, incident green light, and incident blue light and outputs thus-synthesized light from an output surface 40T.

The projection lens unit 41 enlarges and projects the synthesized light outputted from the output surface 40T of the color synthesizing prism 40 onto a projection surface such as a screen.

Configurations of Liquid Crystal Display Units
30R, 30G, and 30B

The liquid crystal display units 30R, 30G, and 30B each include a light modulator (a spatial modulator) that modulates illumination light from the illumination optical system 20 and outputs thus-modulated light. Light of respective colors (red light, green light, and blue light) outputted from the liquid crystal display units 30R, 30G, and 30B is outputted to the color synthesizing prism 40. The liquid crystal display units 30R, 30G, and 30B each include, for example, a transmissive liquid crystal display unit such as an HTPS (high temperature poly-silicon). However, although not specifically illustrated, each of the liquid crystal display units 30R, 30G, and 30B may include, for example, a reflective liquid crystal display unit such as an LCOS (liquid crystal on silicon).

FIG. 2 schematically illustrates a configuration example of the liquid crystal display units 30R, 30G, and 30B. The liquid crystal display units 30R, 30G, and 30B each include the liquid crystal display device 32 between a pair of polarizers (a first polarizer 31 and a second polarizer 34). The liquid crystal display unit 30R modulates, for example, incident red light (a wavelength from 600 nm to 700 nm both inclusive) to generate red image light. The liquid crystal display unit 30G modulates, for example, incident green light (a wavelength from 500 nm to 600 nm both inclusive) to generate green image light. The liquid crystal display unit 30B modulates, for example, incident blue light (a wavelength from 430 nm to 500 nm both inclusive) to generate blue image light.

In the present embodiment, in each of these liquid crystal display units 30R, 30G, and 30B, an optical compensator 33 is provided between at least one polarizer of the first polarizer 31 or the second polarizer 34, and the liquid crystal display device 32. The liquid crystal display device 32 is sealed by a pair of substrates 32A and 32B. Here, as an example, the optical compensator 33 is provided between the second polarizer 34 and one substrate (the substrate 32B on light output side) of a pair of substrates that seal the liquid crystal display device 32. It is sufficient if the optical compensator 33 is provided in a light path of light passing through the liquid crystal display device 32, but the optical compensator 33 is preferably provided between the pair of polarizers (the first polarizer 31 and the second polarizer 34) and the liquid crystal display device 32. In the liquid crystal display units 30R, 30G, and 30B, the first polarizer 31 and the second polarizer 34 may be bonded to the substrates 32A and 32B, but are desirably disposed as members separated from the substrates 32A and 32B. In general, a polarizer in a liquid crystal projector generates heat by absorbing light to easily cause an increase in temperature; therefore, disposing the first polarizer 31 and the second polarizer 34 in such a manner suppresses transfer of this heat to the liquid crystal display device 32. In contrast, the optical compensator 33 hardly absorbs light; therefore, the optical compensator 33 may be bonded to the substrate 32B, or the optical compensator 33 and the substrate 32B may be disposed as members separated from each other. It is to be noted that the "optical compensator 33" in the present embodiment corresponds to a specific example of an "optical compensation device" in the present disclosure.

For example, one polarizer of the first polarizer 31 and the second polarizer 34 selectively allows a first polarized component (an s-polarized component or a p-polarized component) to pass therethrough, and the other polarizer allows a second polarized component (a p-polarized component or an s-polarized component) to pass therethrough.

The liquid crystal display device 32 includes a liquid crystal layer between a pair of electrodes, and modulates light transmittance by applying a drive voltage to the liquid crystal layer through the pair of electrodes. For example, vertical alignment (VA) mode liquid crystal is used for this liquid crystal layer of the liquid crystal display device 32. In the VA mode liquid crystal layer, a so-called pretilt is given to a liquid crystal molecule to enhance response characteristics to an applied voltage. It is to be noted that, for example, liquid crystal of any other drive mode such as a TN (Twisted Nematic) mode, an ECB (Electrically Controlled Birefringence) mode, an FFS (Fringe Field Switching) mode, or an IPS (In Plane Switching) mode may be used for the liquid crystal layer.

The optical compensator 33 includes an optical device that compensates residual retardation of the liquid crystal display device 32 as described above. For example, in the liquid crystal layer of the liquid crystal display device 32, a phase difference (residual retardation) occurs depending on the pretilt, an interface alignment state, or the like of the liquid crystal molecule, which changes the transmittance. In particular, residual retardation when a black screen is displayed causes light to slightly pass through the VA mode liquid crystal, which results in a decrease in contrast. The retardation of the optical compensator 33 is set to a value that counteracts such residual retardation.

FIG. 3 illustrates a configuration example of the optical compensator 33. The optical compensator 33 includes, for example, a layered structure 332 on a substrate 331. The substrate 331 includes, for example, glass such as borosilicate glass. An optical axis Zc of this optical compensator 33 is set at a tilt from a perpendicular direction of the substrate 331 (a direction perpendicular to a substrate surface) on the basis of a configuration of the layered structure 332 to be described later. As an example, in a case where the liquid crystal display device 32 uses VA mode liquid crystal, a direction (a tilt direction) of the optical axis Zc of the optical compensator 33 is set along a pretilt direction (a longitudinal direction) of the liquid crystal molecule of the liquid crystal display device 32. It is to be noted that the optical axis Zc of the optical compensator 33 is defined as an Nz axis of an index ellipsoid as illustrated in FIGS. 4A and 4B. This optical compensator 33 serves as a so-called negative C-plate. That is, a relationship of Nx=Ny>Nz is established in the index ellipsoid.

FIG. 5 illustrates a detailed configuration example of the layered structure 332. As seen from the drawing, the layered structure 332 includes, for example, a first underlayer 332A, a first multilayered film 332B, a second underlayer 332C, and a second multilayered film 332D in this order from side of the substrate 331. The first multilayered film 332B is provided on the first underlayer 332A, and the second multilayered film 332D is provided on the second underlayer 332C.

The first underlayer 332A includes a plurality of structures 332A1 two-dimensionally arranged. The plurality of structures 332A1 each include a first main surface S1 and a first auxiliary surface S2 inclined in directions intersecting with each other. The first main surface S1 intersects with a plane (a plane S) parallel to a main surface of the substrate 331, and forms an inclination angle e11 with respect to the plane S. The first auxiliary surface S2 has an area smaller than an area of the first main surface S1. The first auxiliary surface S2 intersect with the plane S at a position different from a position where the first main surface S1 intersects with the plane S. That is, the plane S, the first main surface S1, and the first auxiliary surface S2 have a triangular cross-sectional shape. The first auxiliary surface S2 forms an inclination angle e12 with respect to the plane S. The inclination angle e12 of the first auxiliary surface S2 is different from the inclination angle e11 of the first main surface S1. In this example, the inclination angle e11 of the first main surface S1 is smaller than the inclination angle e12 of the first auxiliary surface S2 (e11<e12).

The plurality of structures 332A1 each have a polyhedron including such a first main surface S1 and such a first auxiliary surface S2, or a curved surface. In the example in FIG. 5, the structures 332A1 each have a polyhedron, and the first underlayer 332A has, for example, a serrated cross-sectional shape. Constituent materials of this first underlayer 332A include an inorganic insulating material, for example, a material having high adhesion to the substrate 331 of constituent materials of refractive index films 332b1 and 332b2 to be described later.

An array pitch (pitch) A of the plurality of structures 332A1 is set to be smaller than a wavelength of visible light. Specifically, the array pitch A is set to be smaller than any of wavelengths incident on the liquid crystal display units 30R, 30G, and 30B. As an example, the array pitch A is less than a wavelength (for example, 430 nm) incident on the liquid crystal display unit 30B that is the shortest wavelength. However, the array pitch A is desirably 380 nm or less, more desirably 300 nm or less, still more desirably 250 nm or less. As described in detail later, this is because a smaller array pitch A further suppresses an influence of diffraction on the optical compensator 33, which makes it possible to reduce light loss.

The first multilayered film 332B provided on the plurality of structures 332A1 is formed along the shapes (serrated cross-sectional shapes) of the structures 332A1. The first multilayered film 332B serves, for example, as a negative C-plate, and includes a plurality of refractive index films 332b1 and 332b2 that are stacked alternately and repeatedly. A refractive index of the refractive index film 332b1 and a refractive index of the refractive index film 332b2 are different from each other, and such a difference in refractive index is preferably large. Specifically, a difference in the refractive index between the refractive index film 332b1 and the refractive index film 332b2 is preferably 0.54 or more. This makes it possible to reduce a film thickness (film thicknesses tB1 and tB2 to be described later) of the first multilayered film 332B. The film thickness of each of the refractive index films 332b1 and 332b2 is, for example, from 10 nm to 50 nm both inclusive, and the respective layer numbers of the refractive index films 332b1 and 332b2 are, for example, from 10 to 200 both inclusive. These refractive index films 332b1 and 332b2 include, for example, an inorganic insulating material. Examples of the inorganic insulating material include silicon oxide ($SiO_x$), silicon nitride (SiN), silicon oxynitride (SiON), aluminum oxide ($Al_2O_3$), titanium oxide ($TiO_2$), tantalum oxide ($Ta_2O_5$), zirconium oxide ($ZrO_2$), niobium oxide ($Nb_2O_5$), and the like.

In the first multilayered film 332B, the film thickness tB1 in a region RA1 opposed to the first main surface S1 of the structure 332A1 and the film thickness t2 in a region RA2 opposed to the first auxiliary surface S2 are different from each other. Specifically, the film thickness tB1 in the region RA1 is larger than the film thickness tB2 in the region RA2. The film thicknesses tB1 and tB2 respectively correspond to total film thicknesses of the plurality of refractive index films 332b1 and 332b2 that are stacked in the regions RA1 and RA2. The film thicknesses tB1 and tB2 are determined in accordance with the inclination angle e11 of the first main surface S1 and the inclination angle e12 of the first auxiliary surface S2. The individual film thicknesses of the refractive index films 332b1 and 332b2 in the first multilayered film 332B may be the same as each other as described above, or may be different from one another. However, it is desirable that a ratio between respective film thicknesses of the refractive index films 332b1 and 332b2 be 1:1. This makes it possible to reduce the refractive index Nz of the index ellipsoid and to efficiently find a retardation value as described below.

That is, Nx, Ny, and Nz of the index ellipsoid are as represented by the following expressions (1) and (2), where $n_1$ is the refractive index of the refractive index films 332b1, $t_{11}$ is a per-layer film thickness of the refractive index films 332b1, $n_2$ is the refractive index of the refractive index film 332b2, and $t_{12}$ is a per-layer film thickness of the refractive index films 332b2. This makes it possible to represent a retardation value Rth in a thickness direction as in an expression (3). In these expressions (1) to (3), in a case where the ratio of the film thickness of the refractive index films 332b1 and the film thickness of the refractive index films 332b2 is 1:1, a difference between Nx and Nz reaches a maximum, and a value of Rth also reaches a maximum.

[Math. 1]

$$Nx = Ny = \sqrt{\left(\frac{t11}{t11+t12}\right)n_1^2 + \left(\frac{t12}{t11+t12}\right)n_2^2} \quad (1)$$

$$Nz = \sqrt{\left(\frac{t11}{t11+t12}\right)\frac{1}{n_1^2} + \left(\frac{t12}{t11+t12}\right)\frac{1}{n_2^2}} \quad (2)$$

$$Rth = \left(\frac{Nx+Ny}{2} - Nz\right)t1 \quad (3)$$

The second underlayer 332C opposed to the first underlayer 332A with the first multilayered film 332B interposed therebetween is provided on and in contact with the first multilayered film 332B, for example. The second underlayer 332C includes a plurality of structures 332C1 two-dimensionally arranged. For example, shapes of the structures 332C1 are substantially the same as the shape of the first underlayer 332A, but may be different from the shape of the first underlayer 332A.

The plurality of structures 332C1 each include a second main surface S3 and a second auxiliary surface S4 inclined in directions intersecting with each other. For example, the second main surface S3 intersects with the plane S, and forms an inclination angle f11 with respect to the plane S. For example, the second main surface S3 is provided substantially parallel to the first main surface S1, and the inclination angle f11 of the second main surface S3 is substantially the same as the inclination angle e11 of the first main surface S1. The inclination angle f11 of the second main surface S3 may be different from the inclination angle e11 of the first main surface S1, but an angle formed by the second main surface S3 and the first main surface S1 is from 0 degrees to 90 degrees both inclusive. For example, a direction of an optical axis set by the inclination angle e11 of the first main surface S1 and a direction of an optical axis set by the inclination angle f11 of the second main surface S3 are substantially the same as each other. Being Substantially the same means that a difference caused by a manufacturing error is acceptable.

The second auxiliary surface S4 has an area smaller than an area of the second main surface S3. The second auxiliary surface S4 intersect with the plane S at a position different from a position where the second main surface S3 intersects with the plane S. That is, the plane S, the second main surface S3, and the second auxiliary surface S4 have a triangular cross-sectional shape. The second auxiliary surface S4 forms an inclination angle f12 with respect to the plane S, for example. The inclination angle f12 of the second auxiliary surface S4 is different from the inclination angle f11 of the second main surface S3. In this example, the inclination angle f11 of the second main surface S3 is smaller than the inclination angle f12 of the second auxiliary surface S4 (f11<f12). The inclination angle f12 of the second auxiliary surface S4 is the substantially the same as the inclination angle e12 of the first auxiliary surface S2. The inclination angle f12 of the second auxiliary surface S4 may be different from the inclination angle e12 of the first auxiliary surface S2, but an angle formed by the second auxiliary surface S4 and the first auxiliary surface S2 is from 0 degrees to 90 degrees both inclusive.

The plurality of structures 332C1 each have a polyhedron including such a second main surface S3 and such a second auxiliary surface S4, or a curved surface. In the example in FIG. 5, the structures 332C1 each have a polyhedron, and the second underlayer 332C has, for example, a serrated cross-sectional shape. Constituent materials of this second underlayer 332C include an inorganic insulating material, for example, a material having high adhesion to the first multilayered film 332B of constituent materials of refractive index films 332d1 and 332d2 to be described later.

An array pitch (pitch) C of the plurality of structures 332C1 is set to be substantially the same as the array pitch A of the structures 332A1 of the first underlayer 332A. The array pitch C may be different from the array pitch A, but is set to be smaller than the wavelength of visible light. Specifically, the array pitch C is set to be smaller than any of wavelengths incident on the liquid crystal display units 30R, 30G, and 30B. As an example, the array pitch C is less than the wavelength (for example, 430 nm) incident on the liquid crystal display unit 30B that is the shortest wavelength. However, the array pitch C is desirably 380 nm or less, more desirably 300 nm or less, still more desirably 250 nm or less.

The second multilayered film 332D provided on the plurality of structures 332C1 is formed along the shapes (serrated cross-sectional shapes) of the structures 332C1. The second multilayered film 332D serves, for example, as a negative C-plate together with the first multilayered film 332B. This second multilayered film 332D includes a plurality of refractive index films 332d1 and 332d2 that are stacked alternately and repeatedly. A refractive index of the refractive index film 332d1 and a refractive index of the refractive index film 332d2 are different from each other, and such a difference in refractive index is preferably large. Specifically, a difference in the refractive index between the refractive index film 332d1 and the refractive index film 332d2 is preferably 0.54 or more. This makes it possible to reduce a film thickness (film thicknesses tD1 and tD2) of the second multilayered film 332D. The film thickness of each of the refractive index films 332d1 and 332d2 is, for example, from 10 nm to 50 nm both inclusive, and the respective layer numbers of the refractive index films 332d1 and 332d2 are, for example, from 10 to 200 both inclusive. These refractive index films 332d1 and 332d2 include, for example, an inorganic insulating material. Examples of the inorganic insulating material include silicon oxide ($SiO_x$), silicon nitride (SiN), silicon oxynitride (SiON), aluminum oxide ($Al_2O_3$), titanium oxide ($TiO_2$), tantalum oxide ($Ta_2O_5$), zirconium oxide ($ZrO_2$), niobium oxide ($Nb_2O_5$), and the like.

In the second multilayered film 332D, the film thickness tD1 in a region RC1 opposed to the second main surface S3 of the structure 332C1 and the film thickness tD2 in a region RC2 opposed to the second auxiliary surface S4 are different from each other. Specifically, the film thickness tD1 in the region RC1 is larger than the film thickness tD2 in the region RC2. The film thicknesses tD1 and tD2 respectively correspond to total film thicknesses of the plurality of refractive index films 332d1 and 332d2 that are stacked in the regions RC1 and RC2. The film thicknesses tD1 and tD2 are determined in accordance with the inclination angle f11 of the second main surface S3 and the inclination angle f12 of the second auxiliary surface S4. The individual film thicknesses of the refractive index films 332d1 and 332d2 in the second multilayered film 332D may be the same as each other as described above, or may be different from each other. However, it is desirable that a ratio between the respective film thicknesses of the refractive index films 332d1 and 332d2 be 1:1. This makes it possible to reduce the refractive index Nz of the index ellipsoid and to efficiently find a retardation value, as described above. The film thickness tD1 of the second multilayered film 332D may be the same as or different from the film thickness tB1 of the first multilayered film 332B. The film thickness tD2 of the second multilayered film 332D may be the same as or different from the film thickness tB2 of the first multilayered film 332B. It is sufficient if the sum of the film thickness of the first multilayered film 332B and the film thickness of the second multilayered film 332D is a multilayered film thickness amount that counteracts residual retardation of the liquid crystal layer.

Workings and Effects

In this projection display apparatus 1, in a case where light (for example, white light) emitted from the light source 11 has entered the illumination optical system 20, while the light is shaped into illumination light, light paths of light of respective colors R, G, and B are separated, and guided to the liquid crystal display units 30R, 30G, and 30B, respectively. For example, the first dichroic mirror 18 reflects red light, and allows green light and blue light to pass therethrough, and the second dichroic mirror 21 reflects the green light, and allows the blue light to pass therethrough. Accordingly, the red light enters the liquid crystal display unit 30R via the first dichroic mirror 18, the second turning mirror 22, and the first field lens 23R. The green light passes through the first dichroic mirror 18 and is reflected by the second dichroic mirror 21, and thereafter passes through the second field lens 23G to enter the liquid crystal display unit 30G. The blue light passes through the first dichroic mirror 18 and the second dichroic mirror 21, and thereafter enters the liquid crystal display unit 30B via the first relay lens 23, the third turning mirror 24, the second relay lens 25, the fourth turning mirror 26, and the third field lens 23B.

In each of the liquid crystal display units 30R, 30G, and 30B, incident light is modulated (an image is generated) on the basis of an image signal of a corresponding color, and this modulated light of the corresponding color is outputted toward the color synthesizing prism 40. The modulated light of the respective colors is synthesized by the color synthesizing prism 40, and thus-synthesized light enters the projection lens unit 41. The light (an image) having entered the projection lens unit 41 is, for example, enlarged and displayed on, for example, a projection surface such as a screen.

In the projection display apparatus 1 using such liquid crystal display units 30R, 30G, and 30B, in the liquid crystal layer of the liquid crystal display device 32, a phase difference (residual retardation) occurs depending on the pretilt, the interface alignment state, or the like of the liquid crystal molecule, which changes the transmittance. In particular, due to the pretilt of the liquid crystal molecule, residual retardation when the black screen is displayed causes light to slightly pass through the VA mode liquid crystal. This results in a decrease in contrast.

Accordingly, there are proposed various optical compensators that compensate this residual retardation of the liquid crystal layer. FIG. 6A illustrates a configuration of an optical compensator 100 according to a comparative example of the present embodiment. As in the present embodiment, the optical compensator 100 includes a dielectric multilayer film, and serves as a negative C-plate. This optical compensator 100 includes a multilayered film 102 on a substrate 101. The multilayered film 102 includes a plurality of refractive index films 102a and 102b that are stacked alternately and repeatedly. As seen from the drawing, in the optical compensator 100, the multilayered film 102 is formed on the flat substrate 101, and an optical axis Zc of the optical compensator 100 is disposed along a perpendicular direction of the substrate 101 (a direction perpendicular to an in-plane direction of the substrate 101). As illustrated in FIG. 6B, this optical axis Zc of the optical compensator 100 is disposed at a tilt with respect to a liquid crystal layer 103, which makes it possible to compensate residual retardation of the liquid crystal layer 103. Specifically, the optical compensator 100 is installed at a tilt physically to dispose the optical axis Zc of the optical compensator 100 along a direction substantially parallel to a longitudinal direction Zp of a liquid crystal molecule 103a (a direction corresponding to a pretilt angle of the liquid crystal molecule 103a). However, this optical compensator 100 needs a mechanism or space for tilting the optical compensator 100.

Further, in addition to this, there is also an optical compensator using a prism shape (for example, PTL 4 described above). Using the prism shape makes it possible to tilt only the optical axis Zc without tilting the optical compensator itself as in a comparative example 1.

However, in a case where the optical compensator uses the prism shape, light loss (diffraction or scattering) due to the prism shape is caused, which results in a decrease in transmittance and a decrease in contrast.

In contrast, in the present embodiment, as illustrated in FIG. 7A, the optical compensator 33 includes the first underlayer 332A including the plurality of structures 332A1 and the second underlayer 332C including the plurality of structures 332C1. The structures 332A1 each include the first main surface Si and the first auxiliary surface S2 having inclination angles different from each other, and the structures 332C1 each include the second main surface S3 and the second auxiliary surface S4 having inclination angles different from each other. In the optical compensator 33, the first multilayered film 332B including the plurality of refractive index films 332$b$1 and 332$b$2 that are stacked alternately and repeatedly is formed on the first underlayer 332A, and the second multilayered film 332D including the plurality of refractive index films 332$d$1 and 332$d$2 that are stacked alternately and repeatedly is formed on the second underlayer 332C.

Accordingly, as illustrated in FIG. 7B, the optical compensator 33 optically serves as a negative C-plate with the optical axis Zc tilted. The optical axis Zc of the optical compensator 33 is disposed along a direction substantially parallel to the longitudinal direction Zp of a liquid crystal molecule 32a (a direction corresponding to on the pretilt angle of the liquid crystal molecule 103a). Using such an optical compensator 33 makes it possible to compensate residual retardation of the liquid crystal display device 32. In addition, the array pitch A of the structures 332A1 in the first underlayer 332A and the array pitch C of the structures 332C1 in the second underlayer 332C are smaller than the wavelength of visible light, which suppresses the influence of diffraction on the optical compensator 33 and reduce light loss.

Further, in the present embodiment, the refractive index films 332$b$1 and 332$b$2 included in the first multilayered film 332B and the refractive index films 332$d$1 and 332$d$2 included in the second multilayered film 332D include an inorganic insulating material; therefore, as compared with a case where refractive index films include an organic material such as, for example, a liquid crystal polymer (PTL 1 described above), material degradation due to heat and light is less likely to occur. This makes it possible to achieve the liquid crystal display units 30R, 30G, and 30B and the projection display apparatus 1 that do not need component replacement and the like (are maintenance free) even after a long period of use.

Moreover, in the present embodiment, it is possible to dispose the optical axis Zc at a tilt without physically tilting the optical compensator 33 itself as illustrated in FIG. 7B, which makes it possible to achieve space saving and a simplified configuration, as compared with the comparative example 1. This also makes it possible to achieve cost reduction.

In addition, in the present embodiment, the second underlayer 332C is provided between the first multilayered film 332B and the second multilayered film 332D. This makes it possible to stably keep tilt of the optical axis Zc of the optical compensator 33. This is described below.

FIG. 8 illustrates a schematic cross-sectional configuration of a layered structure 332 including only the first multilayered film 332B on the first underlayer 332A. That is, the layered structure 332 does not include the second underlayer (the second underlayer 332C in FIG. 5). In such a layered structure 332, the film thickness (the film thicknesses tB1 and tB2) of the first multilayered film 332B becomes large to cause the layered structure 332 to serve as a negative C-plate. Accordingly, the first multilayered film 332B becomes flat with distance from the first underlayer 332A. That is, it is not possible to form the first multilayered film 332B along the shape of the structure 332A1, which makes the tilt of the optical axis Zc of the optical compensator 33 unstable.

In contrast, in the present embodiment, the first multilayered film 332B is formed on the first underlayer 332A, and the second multilayered film 332D is formed on the second underlayer 332C, which makes it possible to reduce the respective film thicknesses tB1, tB2, tD1, and tD2 of the first multilayered film 332B and the second multilayered film 332D. Accordingly, the first multilayered film 332B is formed along the shapes of the structures 332A1 of the first underlayer 332A, and the second multilayered film 332D is formed along the shapes of the structures 332C1 of the second underlayer 332C. This makes it possible to stably keep the tilt of the optical axis Zc of the optical compensator 33.

As described above, in the present embodiment, in each of the liquid crystal display units 30R, 30G, and 30B, the optical compensator 33 includes the first underlayer 332A including the plurality of structures 332A1 and the second underlayer 332C including the plurality of structures 332C1. The structures 332A1 each include the first main surface S1 and the first auxiliary surface S2 having inclination angles (e11 and e12) different from each other, and the structures 332C1 each include the second main surface S3 and the second auxiliary surface S4 having inclination angles (f11 and f12) different from each other. In the optical compensator 33, the first multilayered film 332B including the plurality of refractive index films 332$b$1 and 332$b$2 is formed on the first underlayer 332A, and the second multilayered film 332D including the plurality of refractive index films 332$d$1 and 332$d$2 is formed on the second underlayer 332C. This makes it possible to achieve the function of a negative C-plate with the optical axis Zc tilted and to compensate residual retardation of the liquid crystal display device 32. Further, the array pitch A of the plurality of structures 332A1 in the first underlayer 332A and the array pitch C of the plurality of structures 332C1 in the second underlayer 332C are smaller than the wavelength of visible light, which makes it possible to reduce light loss due to the influence of diffraction on the optical compensator 33.

This consequently makes it possible to achieve high luminance and a high contrast ratio.

Other embodiments and modification examples of the present disclosure are described below. It is to be noted that components similar to those in the first embodiment described above are denoted by the same reference numerals, and description thereof is omitted as appropriate.

Second Embodiment

FIG. 9 illustrates a configuration example of a liquid crystal display unit according to a second embodiment of the present disclosure. This liquid crystal display unit corresponds to any of the liquid crystal display units 30R, 30G, and 30B according to the first embodiment described above, and is applicable to a projection display apparatus including components similar to those in the first embodiment described above (the light source 11, the illumination optical system 20, the color synthesizing prism 40, and the projection lens unit 41).

The liquid crystal display unit according to the present embodiment includes a light modulator (a spatial modulator) that modulates light outputted from the illumination optical system 20 and outputs the modulated light, as in the liquid crystal display units 30R, 30G, and 30B according to the first embodiment described above. In addition, the liquid crystal display unit according to the present embodiment includes a liquid crystal display device (a liquid crystal display device 35) between a pair of polarizers (the first polarizer 31 and the second polarizer 34).

However, in the present embodiment, unlike the first embodiment described above, an optical compensation device (an optical compensation layer 36) that compensates residual retardation of the liquid crystal display device 35 is provided between the liquid crystal display device 35 and at least one substrate of a pair of substrates (a drive substrate 351 and a counter substrate 356) that seal the liquid crystal display device 35. The drive substrate 251 and the counter substrate 356 are disposed opposed to each other.

FIG. 10 illustrates a configuration example of a main section for describing the optical compensation layer 36. The liquid crystal display device 35 is sealed between the drive substrate 351 including a TFT 352 and the like and the counter substrate 356, and includes a liquid crystal layer 355 between a pair of electrodes (a pixel electrode 354$a$ and a counter electrode 354$b$). In the present embodiment, the optical compensation layer 36 is provided between one substrate of the drive substrate 351 and the counter substrate 356 and one electrode of the pixel electrode 354$a$ and the counter electrode 354$b$. In this example, the optical compensation layer 36 is provided between the counter substrate 356 and the counter electrode 354$b$. A lens 357 (a second lens) is provided for each pixel P between the counter substrate 356 and the counter electrode 354$b$ (the optical compensation layer 36). It is to be noted that the "optical compensation layer 36" in the present embodiment corresponds to a specific example of an "optical compensation device" in the present disclosure.

The drive substrate 351 includes, for example, a pixel circuit including wiring lines such as a signal line and a scanning line, a storage capacitor, and the like that are not illustrated, together with the TFT 352.

As illustrated in FIG. 11, a lens 357A (a first lens) may be provided on the drive substrate 351. The lens 357A opposed to the liquid crystal layer 355 with the drive substrate 351 interposed therebetween includes, for example, a microlens, and is disposed on a surface, opposite to a surface where the pixel electrode 354a is provided, of the drive substrate 351. The lens 357A is covered with an inorganic film 357B. The inorganic film 357B includes an inorganic material transparent to light of a wavelength in a visible region. Specifically, it is possible to use a silicon oxide ($SiO_2$) film, or the like for the inorganic film 357B.

The liquid crystal display device 35 includes the pixel electrode 354a, the liquid crystal layer 355, and the counter electrode 354b in this order from side of the drive substrate 351. The light transmittance of the liquid crystal display device 353 is modulated by applying a drive voltage to the liquid crystal layer 355 through the pixel electrode 354a and the counter electrode 354b.

The pixel electrode 354a is provided between the drive substrate 351 and the liquid crystal layer 355. The pixel electrode 354a is provided for each pixel, for example. For example, VA mode liquid crystal is used for the liquid crystal layer 355 between the pixel electrode 354a and the counter electrode 354b as in the liquid crystal layer of the liquid crystal display device 32 according to the first embodiment described above. Further, in addition to this, for example, liquid crystal of TN mode, ECB mode, FFS mode, IPS mode, or the like may be used. The counter electrode 354b is opposed to the pixel electrode 354a with the liquid crystal layer 355 interposed therebetween. The counter electrode 354b is provided common to all pixels, for example. It is to be noted that unillustrated alignment films are formed between the pixel electrode 354a and the liquid crystal layer 355 and between the counter electrode 354b and the liquid crystal layer 355.

The optical compensation layer 36 includes an optical device that compensates residual retardation of the liquid crystal layer 355, as in the optical compensator 33 in the first embodiment described above. As described above, in the liquid crystal layer 355, a phase difference (residual retardation) occurs depending on the pretilt or the like of a liquid crystal molecule, which changes the transmittance. In particular, in VA mode liquid crystal, residual retardation when the black screen is displayed results in a decrease in contrast. The retardation of the optical compensation layer 36 is set to a value that counteracts this residual retardation of the liquid crystal layer 355.

As in the optical compensator 33 in the first embodiment described above, this optical compensation layer 36 has the function of a negative C-plate, and includes the first underlayer 332A, the first multilayered film 332B, the second underlayer 332C, and the second multilayered film 332D in order from side of the counter substrate 356, for example. The first multilayered film 332B is formed on the first underlayer 332A, and the second multilayered film 332D is formed on the second underlayer 332C. The optical axis Zc is set at a tilt from a direction perpendicular to a substrate surface. As an example, in a case where the liquid crystal layer 355 includes VA mode liquid crystal, the optical axis Zc of the optical compensation layer 36 is set along a pretilt direction (a longitudinal direction) of the liquid crystal molecule of the liquid crystal layer 355.

However, the optical compensation layer 36 in the present embodiment includes a planarizing layer 332E on a surface, on side of the counter electrode 354b, of the second multilayered film 332D. The planarizing layer 332E includes, for example, an inorganic insulating material equivalent to the refractive index films 332d1 and 332d2, and has, for example, a film thickness larger than the film thickness of each of the refractive index films 332b1 and 332b2. A surface, on side of the second multilayered film 332D, of this planarizing layer 332E has a projected and recessed shape along the shapes of the structures 332C1 (refer to FIG. 5), and a surface on side of the counter electrode 354b is flat.

The counter substrate 356 includes, for example, a light-transmissive inorganic insulating material such as glass. The lens 357 includes a microlens, for example. The lens 357 concentrates light on a pixel opening, thereby suppressing light loss in the wiring lines and the pixel circuit that are disposed in the drive substrate 351. This makes it possible to improve light use efficiency.

An antireflection film may be provided between the planarizing layer 332E and the counter electrode 354b or between the first underlayer 332A and the lens 357.

FIGS. 12A, 12B, 12C, 12D, 12E, 12F, 12G, 12H, 13A, 13B, 13C, 13D, 14A, 14B, 14C, and 14D are schematic cross-sectional views of processes for forming the optical compensation layer 36 in process order.

First, for example, a mold substrate 51 including a silicon (Si (111)) substrate is prepared, and a mold structure (a mold structure 511 in FIG. 12F to be described later) is formed for formation of inclination structures of the first underlayer 332A and the first multilayered film 332B.

Specifically, first, as illustrated in FIG. 12A, a hard mask 52 and an antireflection film 53 are formed on an entire surface of the mold substrate 51 in this order, and thereafter, a resist 54 having a predetermined pattern is formed on the antireflection film 53. The hard mask 52 is formed using silicon nitride (SiN), for example.

Next, as illustrated in FIG. 12B, the hard mask 52 is etched. Thus, the hard mask 52 having the same pattern as the pattern of the resist 54 is formed. Subsequently, as illustrated in FIG. 12C, the resist 54 and the antireflection film 53 are removed.

Next, as illustrated in FIG. 12D, anisotropic etching of the mode substrate 51 is performed. The anisotropic etching is performed using potassium hydroxide (KOH), for example. A serrated cross-sectional shape is formed on the mold substrate 51 by this anisotropic etching. Next, the hard mask 52 is removed (FIG. 12E). Thereafter, for example, extremely small projections (notches) are removed by etching back (FIG. 12F). Thus, a plurality of mold structures 511 is formed on the mold substrate 51. The plurality of mold structures 511 each includes a surface 51A and a surface 51B having inclination angles different from each other. For example, the surface 51A corresponds to the first main surface S1 of the structure 332A1, and the surface 51B corresponds to the first auxiliary surface S2 of the structure 332A1. Nanoimprint may be used for the mold substrate 51 as a method of forming the plurality of mold structures 511.

After the plurality of mold structures 511 is formed, the first multilayered film 332B is formed on the mold structures 511, as illustrated in FIG. 12G. Specifically, for example, the refractive index films 332b1 including silicon oxide and the refractive index films 332b2 including titanium oxide are alternately formed a plurality of times. Film formation is performed using a CVD (Chemical Vapor Deposition) method, a sputtering method, or the like, for example. Thus, the respective refractive index films 332b1 and 332b2 are deposited while the refractive index films 332b1 and 332b2 maintain inclination structures of the mold structures 511 (inclination angles of the surface 51A and the surface 51B). In other words, the respective refractive index films 332b1 and 332b2 are deposited while maintaining inclined surfaces respectively corresponding to the inclination angles of the surface 51A and the surface 51B of the mold substrate 511. In addition, the thickness of the first multilayered film 332B differs between a region opposed to the surface 51A and a region opposed to the surface 51B in accordance with the inclination angles of the surface 51A and the surface 51B.

After the first multilayered film 332B is formed, a portion (a first underlayer 332AA) of the first underlayer 332A is formed on the first multilayered film 332B, as illustrated in FIG. 12H. The first underlayer 332AA is formed using silicon oxide, for example. One surface (a surface in contact with the first multilayered film 332B) of the first underlayer 332AA is formed along the inclination structures of the mold structures 511. Another surface of the first underlayer 332AA is planarized using CMP (Chemical Mechanical Polishing), for example.

After the first multilayered film 332B and the first underlayer 332AA are formed on the mold substrate 51, the first multilayered film 332B and the first underlayer 332AA are bonded to the counter substrate 356, as illustrated in FIG. 13A. For example, the lens 357 and a remaining portion (a first underlayer 332AB) of the first underlayer 332A are formed in advance on the counter substrate 356. The counter substrate 356 and the mold substrates 51 are bonded to each other to cause the first underlayer 332AB formed on the counter substrate 356 and the first underlayer 332AA formed on the mold substrate 51 to come into contact with each other. Thus, the first underlayer 332A and the first multilayered film 332B are formed (FIG. 13B).

Next, as illustrated in FIG. 13C, the mold substrate 51 is removed. The mold substrate 51 is removed using tetramethylammonium hydroxide (TMAH), potassium hydroxide, or the like, for example. Subsequently, as illustrated in FIG. 13D, a portion (a second underlayer 332CB) of the second underlayer 332C is formed on the first multilayered film 332B, and is planarized.

In contrast, as illustrated in FIG. 14A, the second multilayered film 332D and a remaining portion (a second underlayer 332CA) of the second underlayer 332C are formed on the mold substrate 51 in a way similar to a way of forming the first multilayered film 332B and the first underlayer 332AA (refer to FIGS. 12A, 12B, 12C, 12D, 12E, 12F, 12G, and 12H). They are bonded to the counter substrate 356 on which the first underlayer 332A, the first multilayered film 332B, and the second underlayer 332CB are formed (FIG. 14B).

Subsequently, as illustrated in FIG. 14C, the mold substrate 51 is removed. Thereafter, the planarizing layer 332E is formed on the second multilayered film 332D. The planarizing layer 332E is formed by forming a film of silicon oxide on the second multilayered film 332D with use of a CVD method, for example, and thereafter planarizing the film. Thus, the optical compensation layer 36 is formed on the counter substrate 356. It is also possible to form the optical compensator 33 (the layered structure 332) described in the first embodiment described above by a method similar to the method described above.

Even in the present embodiment, as in the first embodiment described above, the optical compensation layer 36 optically serves as a negative C-plane with the optical axis Zc tilted. This makes it possible to compensate residual retardation of the liquid crystal layer 355. In addition, the array pitch A of the plurality of structures 332A1 in the first underlayer 332A and the array pitch C of the plurality of structures 332C1 in the second underlayer 332C are smaller than the wavelength of visible light, which makes it possible to reduce light loss due to the influence of diffraction on the optical compensation layer 36. This consequently makes it possible to achieve high luminance and a high contrast ratio, as in the first embodiment described above.

Modification Example 1

FIG. 15 is a schematic diagram for describing an optical compensation layer (an optical compensation layer 36A) according to a modification example 1 of the second embodiment described above. It is to be noted that an optical compensation layer disposed between the drive substrate 351 and the counter substrate 356 is described here as an example as in the second embodiment described above; however, a configuration of the optical compensation layer 36A according to the present modification example is also applicable to an optical compensator (a layered structure) as in the first embodiment described above.

The optical compensation layer 36A includes the first underlayer 332A, the first multilayered film 332B, the second underlayer 332C, the second multilayered film 332D, a third underlayer 332F, a third multilayered film 332G, and the planarizing layer 332E in this order from side of the counter substrate 356. That is, the optical compensation layer 36A includes the third underlayer 332F and the third multilayered film 332G between the second multilayered film 332D and the planarizing layer 332E. The optical compensation layer 36A has a configuration similar to that of the optical compensation layer 36 described in the second embodiment described above except for this point, and also has similar workings and similar effects.

The third underlayer 332F provided on the second multilayered film 332D has a configuration substantially similar to those of the first underlayer 332A and the second underlayer 332C.

The third underlayer 332F includes a plurality of structures 332F1 two-dimensionally arranged. The plurality of structures 332F1 each include a third main surface S5 and a third auxiliary surface S6 inclined in directions intersecting with each other. The third main surface S5 intersects with the plane S, and forms an inclination angle g11 with respect to the plane S. The third auxiliary surface S6 has an area smaller than an area of the third main surface S5. The third auxiliary surface S6 intersects with the plane S at a position different from a position where the third main surface S5 intersects with the plane S. That is, the plane S, the third main surface S5, and the third auxiliary surface S6 have a triangular cross-sectional shape. The third auxiliary surface S6 forms an inclination angle g12 with respect to the plane S. The inclination angle g12 of the third auxiliary surface S6 is different from the inclination angle g11 of the third main surface S5. In this example, the inclination angle g11 of the third main surface S5 is smaller than the inclination angle g12 of the third auxiliary surface S6 (g11<g12).

The plurality of structures 332A1 each have a polyhedron including such a third main surface S5 and such a third auxiliary surface S6, or a curved surface. In the example in FIG. 15, the structures 332F1 each have a polyhedron, and the third underlayer 332F has, for example, a serrated cross-sectional shape.

An array pitch (pitch) F of the plurality of structures 332F1 is set to be smaller than the wavelength of visible light. Specifically, the array pitch F is set to be smaller than any of wavelengths incident on the liquid crystal display units 30R, 30G, and 30B. As an example, the array pitch F is less than the wavelength (for example, 430 nm) incident on the liquid crystal display unit 30B that is the shortest wavelength. However, the array pitch F is desirably 380 nm or less, more desirably 300 nm or less, still more desirably 250 nm or less.

The third multilayered film 332G provided on the plurality of structures 332F1 is formed along the shapes (serrated cross-sectional shapes) of the structures 332F1. The third multilayered film 332G serves, for example, as a negative C-plate together with the first multilayered film 332B and the second multilayered film 332D, and includes a plurality of refractive index films 332g1 and 332g2 that are stacked alternately and repeatedly. A refractive index of the refractive index film 332g1 and a refractive index of the refractive index film 332g2 are different from each other, and such a difference in refractive index is preferably large. Specifically, a difference in the refractive index between the refractive index film 332g1 and the refractive index film 332g2 is preferably 0.54 or more.

In the third multilayered film 332G, a film thickness tG1 in a region RF1 opposed to the third main surface S5 of the structure 332F1 and a film thickness tG2 in a region RF2 opposed to the third auxiliary surface S6 are different from each other. Specifically, the film thickness tG1 in the region RF1 is larger than the film thickness tG2 in the region RF2. The film thicknesses tG1 and tG2 respectively correspond to total film thicknesses of the plurality of refractive index films 332g1 and 332g2 that are stacked in the regions RF1 and RF2. The film thicknesses tG1 and tG2 are determined in accordance with the inclination angle g11 of the third main surface S5 and the inclination angle g12 of the third auxiliary surface S6. The individual film thicknesses of the refractive index films 332g1 and 332g2 in the third multilayered film 332G may be the same as each other as described above, or may be different from each other. However, it is desirable that a ratio between the respective film thicknesses of the refractive index films 332g1 and 332g2 be 1:1.

FIG. 16 illustrates an example of a configuration of the third multilayered film 332G. The film thickness tG1 of the third multilayered film 332G may be the same as or different from the film thickness tB1 of the first multilayered film 332B and the film thickness tD1 of the second multilayered film 332D. The film thickness tG2 of the third multilayered film 332G may be the same as or different from the film thickness tB2 of the first multilayered film 332B and the film thickness tD2 of the second multilayered film 332D. FIG. 16 illustrates a case where the film thicknesses tG1 and tG2 of the third multilayered film 332G are respectively smaller than the film thicknesses tB1 and tB2 of the first multilayered film 332B and the film thicknesses tD1 and tD2 of the second multilayered film 332D; however, the film thicknesses tG1 and tG2 of the third multilayered film 332G may be respectively larger than the film thicknesses tB1 and tB2 of the first multilayered film 332B and the film thickness tD1 and tD2 of the second multilayered film 332D. Alternatively, the film thicknesses tG1 and tG2 of the third multilayered film 332G may be respectively the same as the film thicknesses tB1 and tB2 of the first multilayered film 332B and the film thicknesses tD1 and tD2 of the second multilayered film 332D.

As described above, the optical compensation layer 36A may include the third underlayer 332F and the third multilayered film 332G. Alternatively, the optical compensation layer 36A may include four or more underlayers and four or more multilayered films.

Modification Example 2

FIG. 17 is a schematic diagram for describing the optical compensation layer 36 according to a modification example 2 of the second embodiment described above. The optical compensation layer 36 is disposed between the drive substrate 351 and the pixel electrode 354a, and includes the first underlayer 332A, the first multilayered film 332B, the second underlayer 332C, the second multilayered film 332D, and the planarizing layer 332E from side of the drive substrate 251. As seen from the drawing, the optical compensation layer 36 may be bonded to the drive substrate 351. The optical compensation layer 36 according to the present modification example has a configuration similar to that of the optical compensation layer 36 described in the second embodiment described above except for this point, and also has similar workings and similar effects.

It is sufficient if the optical compensation layer 36 is disposed between the lens 357A and the pixel electrode 354a. For example, the optical compensation layer 36 may be disposed between the lens 357A and the drive substrate 351.

FIG. 18 illustrates the optical compensation layers 36 disposed at two positions. As seen from the drawing, the optical compensation layers 36 may be bonded to the drive substrate 351 and the counter substrate 356.

Third Embodiment

FIG. 19 illustrates a configuration example of a liquid crystal display unit according to a third embodiment of the present disclosure by an exploded perspective view. The liquid crystal display unit corresponds to any of the liquid crystal display units 30R, 30G, and 30B according to the first embodiment described above, and is applicable to a projection display apparatus including components similar to those in the first and second embodiments described above (the light source 11, the illumination optical system 20, the color synthesizing prism 40, and the projection lens unit 41).

The liquid crystal display unit according to the present embodiment includes a light modulator (a spatial modulator) that modulates light outputted from the illumination optical system 20 and outputs the modulated light, as in the liquid crystal display units 30R, 30G, and 30B according to the first and the second embodiments described above. In addition, a pair of substrates (the drive substrate 351 and the counter substrate 356) and the liquid crystal display device 35 are included between a pair of polarizers (the first polarizer 31 and the second polarizer 34). The first polarizer 31 and the second polarizer 34, the drive substrate 351 and the counter substrate 356, and the liquid crystal display device 35 are sandwiched between a pair of protective substrates (protective substrates 371A and 371B). These components are contained between a parting plate 372 and an outer frame 273. A film substrate 358 is coupled to the drive substrate 351. The film substrate 358 is configured to transfer an image signal to the drive substrate 351. Image information necessary for modulation of incident light is supplied from a main body side of the projection display apparatus 1 through the film substrate 358.

In the present embodiment, the optical compensation layer 36 is bonded to at least one of the protective substrates 371A and 371B. That is, in the present embodiment, the optical compensation layer 36 is provided outside the pair of polarizers (the first polarizer 31 and the second polarizer 34) in a light path of light passing through the liquid crystal display device 35. The optical compensation layer 36 has a configuration similar to that of the optical compensation layer 36 described in the second embodiment described above except for this point, and also has similar workings and similar effects.

The protective substrates 371A and 371B include, for example, dustproof glass. For example, the protective substrate 371A is provided between the parting plate 372 and the liquid crystal display device 35, and the protective substrate 371B is provided between the outer frame 373 and the liquid crystal display device 35. That is, the protective substrate 371A is disposed on light incidence side of the liquid crystal display device 35, and the protective substrate 371B is disposed on light output side of the liquid crystal display device 35.

FIG. 20 illustrates a configuration of the optical compensation layer 36 provided in contact with the protective substrate 371A. The optical compensation layer 36 is bonded to a surface, opposed to the liquid crystal display device 35, of the protective substrate 371A, for example. The optical compensation layer 36 includes the first underlayer 332A, the first multilayered film 332B, the second underlayer 332C, the second multilayered film 332D, and the planarizing layer 332E in this order from side of the protective substrate 371A.

FIG. 20 illustrates the optical compensation layer 36 in contact with the protective substrate 371A; however, the optical compensation layer 36 may be provided in contact with the protective substrate 371B. Alternatively, the optical compensation layers 36 may be provided on the protective substrates 371A and 371B.

The parting plate 372 is mounted on the light incidence side of the liquid crystal display device 35, and has an opening opposed to a display region of the liquid crystal display device 35. The outer frame 373 is attached on the light output side of the liquid crystal display device 35, and has a frame shape surrounding end surface sections of the drive substrate 351, the counter substrate 356, and the like.

Even in the present embodiment, as in the first embodiment described above, the optical compensation layer 36 optically serves as a negative C-plane with the optical axis Zc tilted. This makes it possible to compensate residual retardation of the liquid crystal layer 355. In addition, the array pitch A of the plurality of structures 332A1 in the first underlayer 332A and the array pitch C of the plurality of structures 332C1 in the second underlayer 332C are smaller than the wavelength of visible light, which makes it possible to reduce light loss due to the influence of diffraction on the optical compensation layer 36. This consequently makes it possible to achieve high luminance and a high contrast ratio, as in the first embodiment described above.

Although the embodiments and the modification examples thereof have been described above, the present disclosure is not limited to the embodiments and the like described above, and may be modified in a variety of ways. For example, materials, shapes, sizes, and the like of the respective components described in the embodiments and the like described above are merely examples, and are not limited to those described above.

In addition, as exemplified in FIG. 18, optical compensation devices may be disposed at a plurality of positions. For example, an optical compensation device (for example, the optical compensator 33 according to the first embodiment described above) disposed between a polarizer and a substrate, and an optical compensation device (for example, the optical compensation layer 36 according to the second embodiment described above) disposed between a substrate and an electrode may be mixed.

In addition, one of the inclination angles e11 and e12 (or the inclination angles f11 and f12) may be 90°.

In addition, the structures 332A1 and 332C1 may have three or more surfaces, and may have a cross-sectional shape of a trapezoid or the like, for example.

In addition, the plurality of structures 332A1 and 332C1 may be disposed tightly (refer to FIG. 5 and the like), or may be disposed separately from each other.

In addition, the plurality of structures 332A1 and 332C1 may be disposed along one direction in a substrate surface, or may be arranged in a matrix.

In addition, FIG. 5 illustrates a case where an extending direction of the structures 332A1 and an extending direction of the structures 332C1 are substantially parallel to each other; however, as illustrated in FIG. 21, the extending direction of the structures 332A1 and the extending direction of the structures 332C1 may intersect with each other. For example, the extending direction of the structures 332A1 and the extending direction of the structures 332C1 are orthogonal to each other; however, the extending direction of the structures 332A1 and the extending direction of the structures 332C1 may intersect with each other at any other angle. The first multilayered film 332B is provided along the first underlayer 332A, and the second multilayered film 332D is provided along the second underlayer 332B.

It is to be noted that the effects described in this specification are examples, and the effects may be other effects or may further include other effects.

For example, the present disclosure may have the following configurations.

(1)

A liquid crystal display unit including:

a pair of polarizers;

a liquid crystal display device provided between the pair of polarizers; and an optical compensation device provided in a light path of light passing through the liquid crystal display device, the optical compensation device including:

a first underlayer including a plurality of structures that each includes at least two surfaces having inclination angles different from each other, a first multilayered film provided on the first underlayer, and including at least two refractive index films that are alternately stacked and have refractive indices different from each other, a second underlayer including a plurality of the structures, and being opposed to the first underlayer with the first multilayered film interposed therebetween, and a second multilayered film provided on the second underlayer, and including at least two refractive index films that are alternately stacked and have refractive indices different from each other, and an array pitch of the plurality of the structures in each of the first underlayer and the second underlayer being smaller than a wavelength of visible light.

(2)

The liquid crystal display unit according to (1), in which the first underlayer includes a first main surface and a first auxiliary surface having an area smaller than an area of the first main surface, the second underlayer includes a second main surface and a second auxiliary surface having an area smaller than an area of the second main surface, and an angle formed by the first main surface and the second main surface is from 0 degrees to 90 degrees both inclusive.

(3)

The liquid crystal display unit according to (2), in which
a film thickness of the first multilayered film differs between a region opposed to the first main surface and a region opposed to the first auxiliary surface, and
a film thickness of the second multilayered film differs between a region opposed to the second main surface and a region opposed to the second auxiliary surface.

(4)

The liquid crystal display unit according to (1) or (2), in which the array pitch of the plurality of the structures in each of the first underlayer and the second underlayer is 250 nm or less.

(5)

The liquid crystal display unit according to any one of (1) to (4), further including a drive substrate and a counter substrate provided between the pair of polarizers to be opposed each other, in which
the liquid crystal display device includes:
a liquid crystal layer provided between the drive substrate and the counter substrate,
a pixel electrode provided between the liquid crystal layer and the drive substrate, and
a counter electrode provided between the liquid crystal layer and the counter substrate.

(6)

The liquid crystal display unit according to (5), in which the optical compensation device is provided between the counter electrode and the counter substrate.

(7)

The liquid crystal display unit according to (5) or (6), further including a first lens opposed to the liquid crystal layer with the drive substrate interposed therebetween.

(8)

The liquid crystal display unit according to (7), in which the optical compensation device is provided between the pixel electrode and the first lens.

(9)

The liquid crystal display unit according to any one of (5) to (8), further including a second lens provided between the counter electrode and the counter substrate.

(10)

The liquid crystal display unit according to (5), in which the optical compensation device is provided between at least one of the drive substrate or the counter substrate and at least one polarizer of the pair of polarizers.

(11)

The liquid crystal display unit according to (5), further including a pair of protective substrates opposed to each other with the drive substrate and the counter substrate interposed therebetween, in which
the optical compensation device is provided in contact with at least one of the pair of protective substrates.

(12)

The liquid crystal display unit according to any one of (1) to (11), in which the refractive index films having a difference in refractive index of 0.54 or more are stacked in at least one of the first multilayered film or the second multilayered film.

(13)

The liquid crystal display unit according to any one of (5) to (11), in which
the liquid crystal layer includes a vertical alignment type liquid crystal molecule, and
a direction of an optical axis of the optical compensation device is set along a pretilt direction of the liquid crystal molecule.

(14)

The liquid crystal display unit according to any one of (1) to (13), in which the first underlayer and the second underlayer each have a serrated cross-sectional shape.

(15)

The liquid crystal display unit according to any one of (1) to (14), in which the first multilayered film and the second multilayered film each include an inorganic insulating material.

(16)

The liquid crystal display unit according to (15), in which the first multilayered film and the second multilayered film each include one of silicon oxide, silicon nitride, and silicon oxynitride.

(17)

The liquid crystal display unit according to any one of (1) to (16), in which the liquid crystal display unit includes a transmissive liquid crystal display unit.

(18)

The liquid crystal display unit according to any one of (1) to (16), in which the liquid crystal display unit includes a reflective liquid crystal display unit.

(19)

A projection display apparatus provided with a liquid crystal display unit, the liquid crystal display unit including:
a pair of polarizers;
a liquid crystal display device provided between the pair of polarizers; and
an optical compensation device provided in a light path of light passing through the liquid crystal display device,
the optical compensation device including:
a first underlayer including a plurality of structures that each includes at least two surfaces having inclination angles different from each other,
a first multilayered film provided on the first underlayer, and including at least two refractive index films that are alternately stacked and have refractive indices different from each other,
a second underlayer including a plurality of the structures, and being opposed to the first underlayer with the first multilayered film interposed therebetween, and
a second multilayered film provided on the second underlayer, and including at least two refractive index films that are alternately stacked and have refractive indices different from each other, and
an array pitch of the plurality of the structures in each of the first underlayer and the second underlayer being smaller than a wavelength of visible light.

(20)

An optical compensation device including:
a first underlayer including a plurality of structures that each includes at least two surfaces having inclination angles different from each other;
a first multilayered film provided on the first underlayer, and including at least two refractive index films that are alternately stacked and have refractive indices different from each other;
a second underlayer including a plurality of the structures, and being opposed to the first underlayer with the first multilayered film interposed therebetween; and
a second multilayered film provided on the second underlayer, and including at least two refractive index films that are alternately stacked and have refractive indices different from each other, and
an array pitch of the plurality of the structures in each of the first underlayer and the second underlayer being smaller than a wavelength of visible light.

(21)

A method of manufacturing an optical compensation device, the method including:

forming, on a mold substrate, a plurality of mold structures that each includes at least two surfaces having inclination angles different from each other;

forming, on the plurality of mold structures, a multilayered film including at least two refractive index films that are alternately stacked and have refractive indices different from each other;

forming, on the multilayered film, an underlayer having a shape along the mold structures;

separating the mold substrate from the multilayered film; and setting an array pitch of the mold structures to be smaller than a wavelength of visible light.

This application claims the benefit of Japanese Priority Patent Application JP2018-27924 filed with Japan Patent Office on Feb. 20, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A liquid crystal display unit, comprising:
a pair of polarizers;
a liquid crystal display device provided between the pair of polarizers; and
an optical compensation device provided in a light path of light passing through the liquid crystal display device,
the optical compensation device including:
a first underlayer including a plurality of structures that each includes at least two surfaces having inclination angles different from each other,
a first multilayered film provided on the first underlayer, and including at least two refractive index films that are alternately stacked and have refractive indices different from each other,
a second underlayer including a plurality of the structures, and being opposed to the first underlayer with the first multilayered film interposed therebetween, and
a second multilayered film provided on the second underlayer, and including at least two refractive index films that are alternately stacked and have refractive indices different from each other, and
an array pitch of the plurality of the structures in each of the first underlayer and the second underlayer being smaller than a wavelength of visible light.

2. The liquid crystal display unit according to claim 1, wherein
the first underlayer includes a first main surface and a first auxiliary surface having an area smaller than an area of the first main surface,
the second underlayer includes a second main surface and a second auxiliary surface having an area smaller than an area of the second main surface, and
an angle formed by the first main surface and the second main surface is from 0 degrees to 90 degrees both inclusive.

3. The liquid crystal display unit according to claim 2, wherein
a film thickness of the first multilayered film differs between a region opposed to the first main surface and a region opposed to the first auxiliary surface, and
a film thickness of the second multilayered film differs between a region opposed to the second main surface and a region opposed to the second auxiliary surface.

4. The liquid crystal display unit according to claim 1, wherein the array pitch of the plurality of the structures in each of the first underlayer and the second underlayer is 250 nm or less.

5. The liquid crystal display unit according to claim 1, further comprising a drive substrate and a counter substrate provided between the pair of polarizers to be opposed each other, wherein
the liquid crystal display device includes:
a liquid crystal layer provided between the drive substrate and the counter substrate,
a pixel electrode provided between the liquid crystal layer and the drive substrate, and
a counter electrode provided between the liquid crystal layer and the counter substrate.

6. The liquid crystal display unit according to claim 5, wherein the optical compensation device is provided between the counter electrode and the counter substrate.

7. The liquid crystal display unit according to claim 5, further comprising a first lens opposed to the liquid crystal layer with the drive substrate interposed therebetween.

8. The liquid crystal display unit according to claim 7, wherein the optical compensation device is provided between the pixel electrode and the first lens.

9. The liquid crystal display unit according to claim 5, further comprising a second lens provided between the counter electrode and the counter substrate.

10. The liquid crystal display unit according to claim 5, wherein the optical compensation device is provided between at least one of the drive substrate or the counter substrate and at least one polarizer of the pair of polarizers.

11. The liquid crystal display unit according to claim 5, further comprising a pair of protective substrates opposed to each other with the drive substrate and the counter substrate interposed therebetween, wherein
the optical compensation device is provided in contact with at least one of the pair of protective substrates.

12. The liquid crystal display unit according to claim 1, wherein the refractive index films having a difference in refractive index of 0.54 or more are stacked in at least one of the first multilayered film or the second multilayered film.

13. The liquid crystal display unit according to claim 5, wherein
the liquid crystal layer includes a vertical alignment type liquid crystal molecule, and
a direction of an optical axis of the optical compensation device is set along a pretilt direction of the liquid crystal molecule.

14. The liquid crystal display unit according to claim 1, wherein the first underlayer and the second underlayer each have a serrated cross-sectional shape.

15. The liquid crystal display unit according to claim 1, wherein the first multilayered film and the second multilayered film each include an inorganic insulating material.

16. The liquid crystal display unit according to claim 15, wherein the first multilayered film and the second multilayered film each include one of silicon oxide, silicon nitride, and silicon oxynitride.

17. The liquid crystal display unit according to claim 1, wherein the liquid crystal display unit includes a transmissive liquid crystal display unit.

18. The liquid crystal display unit according to claim 1, wherein the liquid crystal display unit includes a reflective liquid crystal display unit.

19. A projection display apparatus provided with a liquid crystal display unit, the liquid crystal display unit comprising:
- a pair of polarizers;
- a liquid crystal display device provided between the pair of polarizers; and
- an optical compensation device provided in a light path of light passing through the liquid crystal display device,
- the optical compensation device including:
  - a first underlayer including a plurality of structures that each includes at least two surfaces having inclination angles different from each other,
  - a first multilayered film provided on the first underlayer, and including at least two refractive index films that are alternately stacked and have refractive indices different from each other,
  - a second underlayer including a plurality of the structures, and being opposed to the first underlayer with the first multilayered film interposed therebetween, and
  - a second multilayered film provided on the second underlayer, and including at least two refractive index films that are alternately stacked and have refractive indices different from each other, and
  - an array pitch of the plurality of the structures in each of the first underlayer and the second underlayer being smaller than a wavelength of visible light.

20. An optical compensation device, comprising:
- a first underlayer including a plurality of structures that each includes at least two surfaces having inclination angles different from each other;
- a first multilayered film provided on the first underlayer, and including at least two refractive index films that are alternately stacked and have refractive indices different from each other;
- a second underlayer including a plurality of the structures, and being opposed to the first underlayer with the first multilayered film interposed therebetween; and
- a second multilayered film provided on the second underlayer, and including at least two refractive index films that are alternately stacked and have refractive indices different from each other, and
- an array pitch of the plurality of the structures in each of the first underlayer and the second underlayer being smaller than a wavelength of visible light.

* * * * *